United States Patent [19]

Nagashima

[11] Patent Number: 5,740,204
[45] Date of Patent: Apr. 14, 1998

[54] DIGITAL RADIOCOMMUNCATION RECEIVER

[75] Inventor: Yasuyuki Nagashima, Tokyo, Japan

[73] Assignee: Mitsubishi Denki Kabushiki Kaisha, Tokyo, Japan

[21] Appl. No.: 695,190

[22] Filed: Aug. 7, 1996

[30] Foreign Application Priority Data

Aug. 31, 1995 [JP] Japan .................... 7-223600

[51] Int. Cl.$^6$ .................... H04L 27/06
[52] U.S. Cl. .................... 375/341; 375/330
[58] Field of Search .................... 375/340, 341, 375/342, 329, 330, 316, 365; 329/304

[56] References Cited

U.S. PATENT DOCUMENTS 5,017,883  5/1991  Divsalar et al. .................... 375/331

FOREIGN PATENT DOCUMENTS 6-97973   4/1994  Japan .
6-152674  5/1994  Japan .

OTHER PUBLICATIONS

Toshiharu Kojima, et al "Differential Detection Scheme for DPSK Using Phase Sequence Estimation" Institute of Electronics, Information and Communication Engineers vol. J76-B-II, Oct., 1993.

*Primary Examiner*—Temesghen Ghebretinsae
*Attorney, Agent, or Firm*—Wolf, Greenfield & Sacks, P.C.

[57] ABSTRACT

A digital radiocommunication receiver includes a demodulation device for a one-symbol unit for detecting a received signal in a unit of one symbol and for outputting a received bit sequence. The demodulation device includes a maximum likelihood sequence estimation for outputting a received bit sequence from a received signal sequence concerning a plurality of symbols. A sync word detecting device determines the detection or nondetection of a sync word from the received bit sequence outputted from the demodulating device for a one-symbol unit. A timing of the bit sequence is made to coincide with a timing of the bit sequence outputted from the demodulating device involving the maximum likelihood sequence estimation. A synchronization controlling device determines a timing of a received frame and controls, as required, a transmission timing using information on the sync word detection. A received information extracting device extracts received information from an output of the demodulating device involving the maximum likelihood sequence estimation.

18 Claims, 13 Drawing Sheets

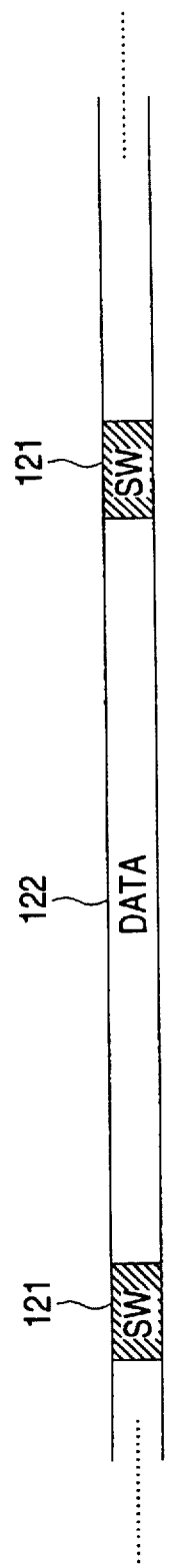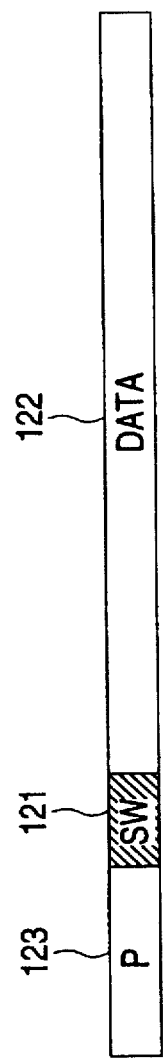

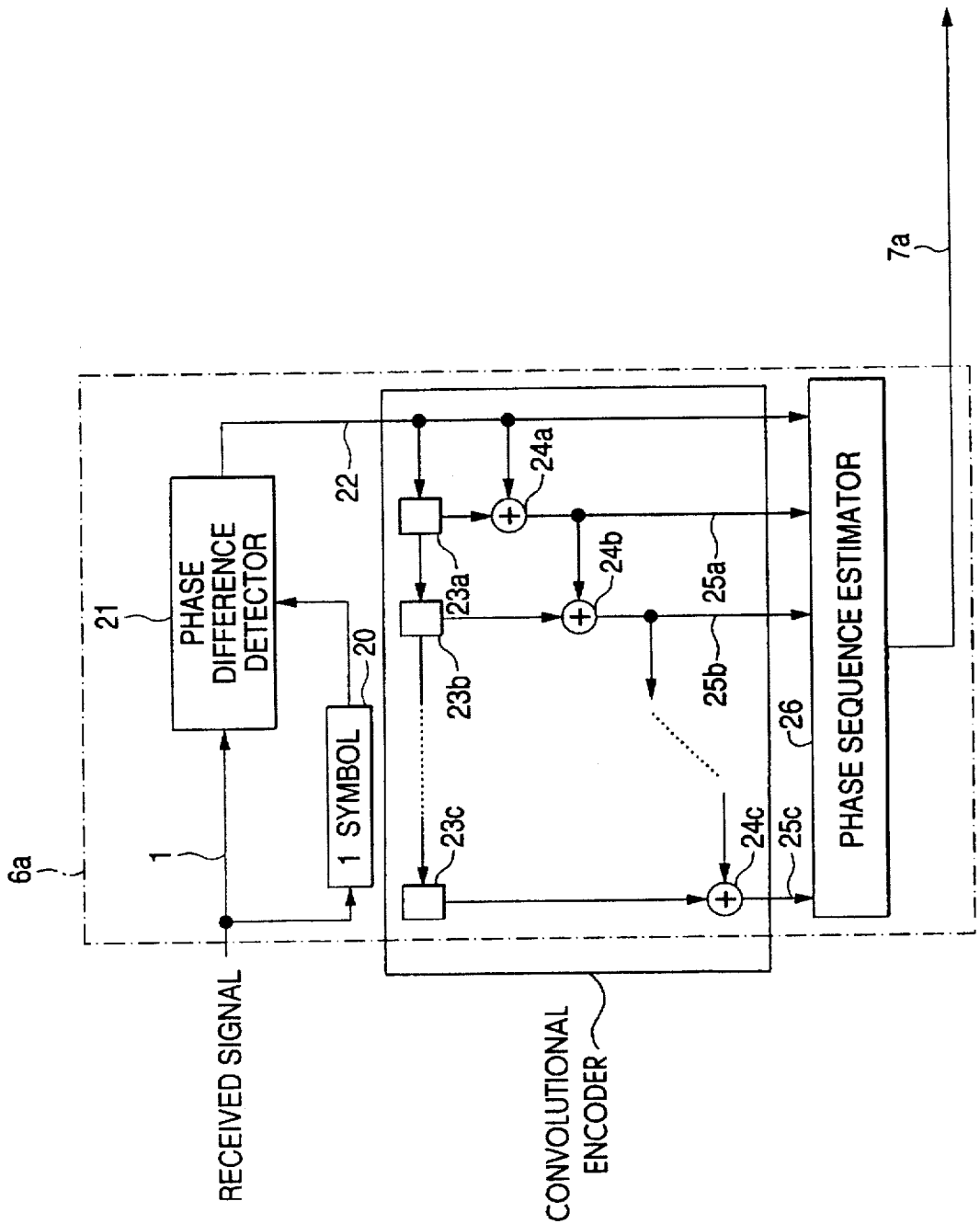

DIGITAL RADIOCOMMUNCATION RECEIVER

BACKGROUND OF THE INVENTION

1. Field of the Invention

The present invention relates to a digital radiocommunication receiver capable of maintaining a small bit error rate in reception information and having an excellent sync-word detection characteristic.

2. Description of the Related Art

In digital radiocommunication, a received bit sequence is extracted by detecting a received signal, and the timing of a frame in the received bit sequence is detected, thereby extracting correct reception information.

Generally, the detection of a frame timing is effected by detecting a bit sequence placed at a predetermined position within a frame and having a sharp autocorrelation, i.e., a sync word. The sync word is also referred to as a unique word.

The methods of demodulating a received signal include a method whereby detection is carried out on the basis of a received signal at each point of time for each symbol, such as envelope detection, coherent detection, and differential detection, as well as a demodulation scheme which involves maximum likelihood sequence estimation for outputting a received bit sequence from a received signal sequence concerning a plurality of symbols.

It is known that the demodulation scheme involving the maximum likelihood sequence estimation makes it possible to improve the bit error rate under the environment of random noise as compared to the method in which detection is carried out on the basis of the received signal at each point of time for each symbol.

(CONVENTIONAL EXAMPLE 1)

FIG. 8 is a schematic block diagram illustrating an example of a digital radiocommunication receiver using the conventional demodulation scheme involving the maximum likelihood sequence estimation.

Incidentally, in the conventional example described below, a description will be given of a case where phase shift keying based on differential coding (hereafter referred to as differential PSK) is adopted as the demodulation scheme.

In FIG. 8, reference numeral 111 denotes a receiving antenna; 112, a down converter; 1, a received signal in an intermediate frequency band which is an output thereof; 6, a detector involving the maximum likelihood sequence estimation; 7, an output thereof; 8, a mapping circuit for replacing the detector output 7 by a corresponding bit sequence; 9, a received bit sequence which is an output thereof; 12, a sync word detector for detecting a sync word from the received bit sequence 9; 13, a threshold of correlation detection in the sync word detector; 14, a sync word detection pulse; 15, a sync word nondetection pulse; 16, a synchronization controller for controlling the synchronization of a frame on the basis of the results of detection of the sync word; 17, received frame timing information; 18, a received information extractor for extracting received information from the received bit sequence 9 in accordance with the received frame timing information 17; and 19, received information which is an output thereof.

Next, a description will be given of the operation of the receiver shown in FIG. 8.

The carrier wave received by the receiving antenna 111 is converted to an intermediate frequency band by the down converter 112, and is inputted to the detector 6 as the received signal 1. The detector 6 demodulates the received signal 1 by the demodulation scheme involving the maximum likelihood sequence estimation, such as the one shown in Conventional Example 2 or 3 described below, and outputs the detected signal 7.

The mapping circuit 8 replaces the detector output 7 by a corresponding bit sequence, and outputs the same to the received bit sequence 9.

The received bit sequence in digital radiocommunication is formed by combining frames, as shown in FIG. 9A, or by bursts, as shown in FIG. 9B.

In FIG. 9A, SW 121 denotes a sync word, and DATA 122 denotes a data portion containing received information. In addition, in FIG. 9B, P 123 denotes a fixed bit string used in the regeneration of a carrier wave, the regeneration of a symbol timing, and the like.

The sync word detector 12 compares the received bit sequence 9 and a reference sync word pattern prepared in advance, and if the number of nonmatching bits is less than or equal to a predetermined threshold, the sync word detection pulse 14 is outputted. Meanwhile, if the number of nonmatching bits is greater than a predetermined threshold at a timing at which the sync word should essentially occur, the sync word nonmatching pulse 15 is outputted.

The synchronization controller 16 estimates the received frame timing on the basis of the sync word detection pulse 14 and the sync word nondetection pulse 15.

In a communication system based on time division multiplex access (TDMA), the timing of a burst which is transmitted needs to be slave-synchronized with the timing of the received frame. In such a case, the synchronization controller 16 also has the function of adjusting a transmission timing as well. The synchronization controller 16 outputs the received frame timing information 17.

The received information extractor 18 extracts the received information 19 from the received bit sequence 9 on the basis of the frame timing obtained from the received frame timing information 17.

(CONVENTIONAL EXAMPLE 2)

FIG. 10 is a schematic block diagram illustrating an example of the internal configuration of the detector 6 of the digital radiocommunication receiver using the conventional demodulation scheme involving the maximum likelihood sequence estimation.

FIG. 10 is a citation of FIG. 2 in "Differential Detection Scheme for DPSK Using Phase Sequence Estimation," Transactions of the institute of Electronics, Information and Communication Engineers, Vol. J76-B-II, No. 10, pp. 783–792 (October, 1993).

In FIG. 10, the portion surrounded by a chain line designated at 6a corresponds to the detector 6 involving the maximum likelihood sequence estimation. Reference numerals 20, 23a to 23c denote delay elements for delaying the signal by the length of one symbol; numeral 21 denotes a phase detector for outputting a phase difference between two inputted signals; 22 denotes an output thereof; 24a to 24c denote adders which use $2\pi$ as a modulus; 25a to 25c denote outputs thereof; and 26 denotes a phase sequence estimator for estimating a phase sequence transmitted thereto on the basis of the one-symbol phase difference signal 22, which constitutes the phase difference signal sequence, and the multiple-phase difference signals 25a to 25c. Namely, this detector 6a demodulates the signal through differential detection outputs of multiple symbols.

Hereafter, the detector which has the characteristic of demodulating the received signal by using a plurality of multiple symbols in the above-described manner will be referred to as the multiple differential detector.

Next, a description will be given of the operation of the detector 6a shown in FIG. 10.

The received signal 1 is inputted to the phase detector 21 and the delay element 20. Namely, if the phase angle of the received signal 1 at a symbol timing i is assumed to be $\theta_{(0)i}$, the one-symbol phase difference signal $\theta_{(1)i}$ is given by the following formula:

$$\theta_{(1)i} = \theta_{(0)i} - \theta_{(0)i-1} \quad (1)$$

Next, the two-symbol phase difference signal 25a, the three-symbol phase difference signal 25b, . . . , and the N-symbol phase difference signal 25c are generated.

The n-symbol (n=2, 3, . . . , N) phase difference signal $\theta_{(n)i}$ is given by the following formula:

$$\begin{aligned}\theta_{(n)i} &= \theta_{(0)i} - \theta_{(0)i-n} \quad (2)\\ &= \theta_{(n-1)i} + \theta_{(1)i-n+1}\end{aligned}$$

By making use of this relationship, the two-symbol phase difference signal 25a, the three-symbol phase difference signal 25b, . . . , and the N-symbol phase difference signal 25c are generated in the manner described below.

For example, with respect to the two-symbol phase difference signal 25a, the one-symbol phase difference signal 22 and a signal (corresponding to $\theta_{(1)i-1}$) obtained by causing that phase difference signal to be transmitted through the delay element 23a are inputted to the adder 24a which uses $2\pi$ as a modulus. The output from the adder 24a is used as the two-symbol phase difference signal 25a.

The same similarly applies to the three-symbol phase difference signal 25b, . . . , and the N-symbol phase difference signal 25c. That is, the two-symbol phase difference signal, . . . , and the (N−1)-symbol phase difference signal, as well as a one-symbol phase difference signal obtained by causing the respective phase difference signals to be transmitted through the two, . . . , (N−1) delay elements 23b–23c, are respectively inputted to the adders 24b–24c which use $2\pi$ as a modulus. Respective outputs from the adders 24b–24c are used as the three-symbol phase difference signal 25b, . . . , and the N-symbol phase difference signal 25c. The one-symbol phase difference signal 22, the two-symbol phase difference signal 25a, . . . , and the N-symbol phase difference signal 25c which are thus obtained constitute convolutional codes with a constraint length N, which uses the one-symbol phase difference signal 22 as an input and conform to generating functions $G_1$, $G_2$, . . . , $G_N$ shown in Formula (3).

$$G_1 = 1$$
$$G_2 = 1 + D$$
$$G_N = 1 + D + \ldots + D^{N-1} \quad (3)$$

where D is a delay operand representing the delay of one symbol.

The one-symbol phase difference signal 22, the two-symbol phase difference signal 25a, the three-symbol phase difference signal 25b, . . . , and the N-symbol phase difference signal 25c, which constitute the convolutional codes, are inputted to the phase sequence estimator 26.

The phase sequence estimator 26 estimates a differential phase sequence 7a in accordance with a maximum likelihood sequence estimation (MLSE) algorithm, such as the Viterbi algorithm.

The differential phase sequence 7a corresponds to the differential phase signal 7 in FIG. 8.

(CONVENTIONAL EXAMPLE 3)

FIG. 11 is a schematic block diagram illustrating another example of the internal configuration of the detector 6 of the digital radiocommunication receiver using the conventional demodulation scheme involving the maximum likelihood sequence estimation.

FIG. 11 is a citation of FIG. 6 in the reference referred to above.

In the drawing, the portion indicated by reference numeral 6b corresponds to the multiple differential detector 6. Numerals 20, 35a–35c denote delay elements for delaying the signal by the length of one symbol; 21 denotes the phase detector for outputting the phase difference between two inputted signals; and 22 denotes an output thereof. These constituent elements are equivalent to those shown in FIG. 10.

Numeral 33 denotes a signal phase temporary estimator for estimating a transmitted differential phase; 34 denotes an output thereof; 36a–36e denote adders which use $2\pi$ as a modulus; and 37a denotes a first residual signal which is the difference between the temporary estimator output 22 and the one-symbol phase difference signal 15. Numerals 37b, 37c, and 37d denote second, third, and N-th residual signals, respectively; 38 denotes a phase sequence estimator which conforms to the MLSE algorithm; 39 denotes an output thereof; and 7b denotes a demodulated differential phase sequence in which the phase sequence estimator output 39 and the phase estimator output 34 are added, and which corresponds to 7 in FIG. 8.

Next, a description will be given of the operation of the detector 6 shown in FIG. 11.

Since the method of generating the one-symbol phase difference signal 22 is similar to the method shown in FIG. 10, a description thereof will be omitted. The one-symbol phase difference signal 22 is inputted to the signal phase temporary estimator 33 to estimate the estimated value 34 of the temporary differential phase.

For example, in a case where differential quadrature phase shift keying is adopted, the signal phase estimator 33 outputs as the estimated value 34 of the differential phase a value which is the closest to the one-symbol phase difference signal 22 among $\pi/4$, $3\pi/4$, $5\pi/4$, and $7\pi/4$. The one-symbol phase difference signal 22 and the estimated value 34 of the differential phase are inputted to the adder 35a which uses $2\pi$ as a modulus, and the first residual signal 37a, i.e., the difference therebetween, is outputted.

Namely, if it is assumed that the one-symbol phase difference signal is $\theta_{(1)i}$, the estimated value 34 of the differential phase is $\Delta\theta_i$, and the one-symbol residual signal 37a is $\epsilon_{(1)i}$, the following formula holds:

$$\epsilon_{(1)i} = \theta_{(1)i} - \Delta\theta_i \quad (4)$$

The second residual signal 37b, the third residual signal 37c, . . . , and the N-th residual signal 37d are generated on the basis of this first residual signal 37a. The n-th residual signal $\epsilon_{(n)i}$ is handled in a manner similar to Formula (2), and is therefore given by the following Formula (5):

$$\epsilon_{(n)i} = \epsilon_{(n-1)i} + \epsilon_{(1)i-n+1} \quad (5)$$

The first residual signal 37a, the second residual signal 37b, . . . , and the N-th residual signal 37d are inputted to the phase sequence estimator 38. The phase sequence estimator 38 operates in accordance with the MLSE algorithm. The temporary estimated value 34 of the differential signal and the output 39 of the phase sequence estimator 38 are inputted to the adder 36e which uses $2\pi$ as a modulus, so as to obtain the differential phase sequence 7b.

Namely, in this conventional example, an attempt is made to reduce the number of states in the maximum likelihood sequence estimation by using the scarce state transition (SST) type Viterbi decoding.

The differential phase sequence 7b corresponds to the demodulated differential phase sequence 7 in FIG. 8.

FIGS. 12A and 12B show a comparison between the output bit sequence 9 in multiple differential detection and an output bit sequence 5 in one-symbol differential detection.

FIG. 12A shows a bit error rate vs. $E_b/N_o$ (power ratio of bit energy to thermal noise) characteristic under Gaussian noise of the output bit sequence in one-symbol differential detection.

As shown in FIG. 12A, the bit error rate under Gaussian noise is smaller in the case of the output bit sequence in multiple differential detection and is superior to that in the case of the output bit sequence in one-symbol differential detection.

Meanwhile, FIG. 12B shows a characteristic of a threshold of correlation vs. the probability of nondetection of a 24-bit sync word with $E_b/N_o$ fixed.

As shown in FIG. 12B, when the threshold of correlation is large under Gaussian noise, the probability of nondetection of the 24-bit sync word is greater in the case of the output bit sequence in multiple differential detection than in the case of the output bit sequence in one-symbol differential detection, and the characteristic of sync word detection in the output bit sequence in multiple differential detection deteriorates.

This phenomenon is based on the following reason.

In general, the MLSE algorithm has a excellent error correction function with respect to random errors, but has a relatively poor restoration capability with respect to burst errors.

A case is now considered in which a phase error in a series of symbols, i.e., a burst error 101, has occurred in the received signal 1, as shown in FIG. 13.

At this time, the symbol error in the output bit sequence in one-symbol differential detection only affects at most the symbol adjacent to the symbol which is actually in error, as shown at 501 in FIG. 13. In contrast, in the case of the symbol error in the output bit sequence in multiple differential detection, a completely erroneous sequence estimation is effected by the MLSE algorithm, so that a considerably large number of symbols may be in error due to the erroneous symbol in the received signal, as shown at 901 in FIG. 13.

In such a case, the bit error rate of the output bit sequence in multiple differential detection deteriorates as compared to that of the output bit sequence in one-symbol differential detection.

In addition, in a case where the sync word cannot be detected even by a large threshold of correlation, a burst error is likely to have occurred within the range of the sync words in the received signal. In such a case, the probability of nondetection of the sync word in the output bit sequence in multiple differential detection is greater than that in the output bit sequence in one-symbol differential detection.

The same holds true of Conventional Example 2 as well.

The digital radiocommunication receiver using the conventional demodulation scheme involving the maximum likelihood sequence estimation is configured as described above, and an average bit error rate in the environment of a random error in an output bit sequence in multiple differential detection is favorably smaller than that in an output bit sequence in one-symbol differential detection. However, if a burst error occurs, the average bit error rate in the output bit sequence in multiple differential detection becomes greater than that in the output bit sequence in one-symbol differential detection and deteriorates due to the provision of the sequence estimation by the MLSE algorithm.

Further, in cases where the sync word cannot be detected even by a large threshold of correlation, a burst error is likely to have occurred within the range of the sync words in the received signal. In such a case, the probability of nondetection of the sync word in the output bit sequence in multiple differential detection is greater than that in the output bit sequence in one-symbol differential detection. Hence, there has been a problem in that the sync word detection characteristic deteriorates.

SUMMARY OF THE INVENTION

The present invention has been devised to overcome the above-described problems, and its object is to provide a digital radiocommunication receiver capable of exhibiting a favorable sync word detection characteristic while maintaining a small bit error rate in received information.

To attain the above object, the digital radiocommunication receiver in accordance with a first aspect of the present invention comprises: demodulation means for a one-symbol unit for detecting a received signal in a unit of one symbol and for outputting a received bit sequence; demodulation means involving maximum likelihood sequence estimation for outputting a received bit sequence from a received signal sequence concerning a plurality of symbols; sync word detecting means for determining the detection or nondetection of a sync word from the received bit sequence outputted from the demodulating means for a one-symbol unit, a timing of the bit sequence being made to coincide with a timing of the bit sequence outputted from the demodulating means involving the maximum likelihood sequence estimation; synchronization controlling means for determining a timing of a received frame, and for controlling, as required, a transmission timing, using information on the sync word detection; and received information extracting means for extracting received information from an output of the demodulating means involving the maximum likelihood sequence estimation.

In the digital radiocommunication receiver in accordance with the first aspect of the present invention which is configured as described above, the bit sequence outputted from the demodulating means for a one-symbol unit is inputted to the sync word detecting means, and the sync word detecting means notifies the detection or nondetection of the sync word by using the same. In addition, the bit sequence outputted from the demodulating means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

The digital radiocommunication receiver in accordance with a second aspect of the present invention comprises: one-symbol differential detecting means for outputting a phase difference between a signal received at each point of time with respect to each symbol and a signal received a one-symbol length in the past; multiple differential detecting means having convolutional encoding means for providing convolutional encoding of the phase difference signal, the multiple differential detecting means involving maximum likelihood sequence estimation for effecting decoding a plurality of phase difference signal sequences outputted from the convolutional encoding means by a maximum likelihood sequence estimation algorithm; differential phase estimating means for estimating a differential phase signal from the phase difference signal outputted from the one-symbol differential detecting means; first mapping means for converting an output of the differential phase estimating means into a corresponding bit sequence; second mapping means for converting a phase difference signal output based on a sequence estimation outputted from the multiple differential detecting means involving the maximum likelihood sequence estimation into a corresponding bit sequence; sync word detecting means for determining the detection or nondetection of a sync word from the bit sequence outputted from the first mapping means, a timing of the bit sequence being made to coincide with a timing of the bit sequence outputted from the second mapping means; synchronization controlling means for determining a timing of a received frame on the basis of information on the sync word detection, and for controlling, as required, a transmission timing; and received information extracting means for extracting received information from the bit sequence outputted from the multiple differential detecting means involving the maximum likelihood sequence estimation.

In the digital radiocommunication receiver in accordance with the second aspect of the present invention which is configured as described above, the bit sequence obtained as the output of the one-symbol differential detecting means, which is a constituent element of the multiple differential detecting means involving the maximum likelihood sequence estimation, is inputted to the sync word detecting means, and the sync word detecting means notifies the detection or nondetection of the sync word by using the same. In addition, the bit sequence obtained as the output of the multiple differential detecting means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

The digital radiocommunication receiver in accordance with a third aspect of the present invention comprises: one-symbol differential detecting means for outputting a phase difference between a signal received at each point of time with respect to each symbol and a signal received a one-symbol length in the past; multiple differential detecting means having differential phase estimating means for determining a transmitted differential phase signal by using the phase difference signal, phase subtracting means for effecting subtraction between an estimated differential phase signal outputted from the differential phase determining means and the phase difference signal, and convolutional encoding means for providing convolutional encoding with respect to an output of the phase subtracting means, the multiple differential detecting means involving maximum likelihood sequence estimation for effecting decoding a plurality of phase difference signal sequences outputted from the convolutional encoding means by a maximum likelihood sequence estimation algorithm; first mapping means for converting an output of the differential phase estimating means for determining the transmitted differential phase signal into a corresponding bit sequence; second mapping means for converting a phase difference signal output based on a sequence estimation outputted from the multiple differential detecting means involving the maximum likelihood sequence estimation into a corresponding bit sequence; sync word detecting means for determining the detection or nondetection of a sync word from the bit sequence outputted from the first mapping means, a timing of the bit sequence being made to coincide with a timing of the bit sequence outputted from the second mapping means; synchronization controlling means for determining a timing of a received frame, and for controlling, as required, a transmission timing, using information on the sync word detection; and received information extracting means for extracting received information from the bit sequence outputted from the multiple differential detecting means involving the maximum likelihood sequence estimation.

In the digital radiocommunication receiver in accordance with the third aspect of the present invention which is configured as described above, the bit sequence obtained as the output of the one-symbol differential detecting means, which is a constituent element of the multiple differential detecting means involving the maximum likelihood sequence estimation, is inputted to the sync word detecting means. The sync word detecting means notifies the detection or nondetection of the sync word by using the same. In addition, the bit sequence obtained as the output of the multiple differential detecting means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

The digital radiocommunication receiver in accordance with a fourth aspect of the present invention comprises: demodulation means for a one-symbol unit for detecting a received signal in a unit of one symbol and for outputting a received bit sequence; demodulation means involving maximum likelihood sequence estimation for outputting a received bit sequence from a received signal sequence concerning a plurality of symbols; delaying means for causing a timing of the bit sequence outputted from the demodulating means for a one-symbol unit to coincide with a timing of the bit sequence outputted from the demodulating means involving the maximum likelihood sequence estimation; bit sequence selecting means for selecting one of the bit sequence outputted from the demodulating means for a one-symbol unit whose timing is adjusted by the delaying means and the bit sequence outputted from the demodulating means involving the maximum likelihood sequence estimation in accordance with a predetermined criterion; sync word detecting means for determining the detection or nondetection of a sync word from the bit sequence outputted from the bit sequence selecting means; synchronization controlling means for determining a timing of a received frame, and for controlling, as required, a transmission timing, using information on the sync word detection; and received information extracting means for extracting received information from the bit sequence outputted from the demodulating means involving maximum likelihood sequence estimation.

In the digital radiocommunication receiver in accordance with the fourth aspect of the present invention which is configured as described above, an output of the bit sequence selecting means, to which is inputted the bit sequence outputted from the demodulating means for a one-symbol unit or the bit sequence outputted from the demodulating means involving the maximum likelihood sequence estimation, is inputted to the sync word detecting means. The sync word detecting means notifies the detection or nondetection of the sync word by using the same. In addition, the bit sequence outputted from the demodulating means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used. Hence, it is possible to obtain a favorable sync word detection characteristic while maintaining a small bit error rate in received information.

The digital radiocommunication receiver in accordance with a fifth aspect of the present invention comprises: one-symbol differential detecting means for outputting a phase difference between a signal received at each point of time with respect to each symbol and a signal received a one-symbol length in the past; multiple differential detecting means having convolutional encoding means for providing convolutional encoding of the phase difference signal, the multiple differential detecting means involving maximum likelihood sequence estimation for effecting decoding a plurality of phase difference signal sequences outputted from the convolutional encoding means by a maximum likelihood sequence estimation algorithm; differential phase estimating means for estimating a differential phase signal from the phase difference signal outputted from the one-symbol differential detecting means; first mapping means for converting an output of the differential phase estimating means into a corresponding bit sequence; second mapping means for converting a phase difference signal output based on a sequence estimation outputted from the multiple differential detecting means involving maximum likelihood sequence estimation into a corresponding bit sequence; delaying means for causing a timing of the bit sequence outputted from the first mapping means to coincide with a timing of the bit sequence outputted from the second mapping means; bit sequence selecting means for selecting one of the bit sequence outputted from the first mapping means whose timing is adjusted by the delaying means and the bit sequence outputted from the second mapping means in accordance with a predetermined criterion; sync word detecting means for determining the detection or nondetection of a sync word from the bit sequence outputted from the bit sequence selecting means; synchronization controlling means for determining a timing of a received frame, and for controlling, as required, a transmission timing, using information on the sync word detection; and received information extracting means for extracting received information from the bit sequence outputted from the multiple differential detecting means involving the maximum likelihood sequence estimation.

In the digital radiocommunication receiver in accordance with the fifth aspect of the present invention which is configured as described above, an output of the bit sequence selecting means, to which is inputted the bit sequence obtained as the output of the one-symbol differential detecting means, which is a constituent element of the multiple differential detecting means involving the maximum likelihood sequence estimation, or the bit sequence obtained as the output of the multiple differential detecting means involving the maximum likelihood sequence estimation, is inputted to the sync word detecting means. The sync word detecting means notifies the detection or nondetection of the sync word by using the same. In addition, the bit sequence outputted from the multiple differential detecting means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used. Hence, it is possible to obtain a favorable sync word detection characteristic while maintaining a small bit error rate in received information.

The digital radiocommunication receiver in accordance with a sixth aspect of the present invention comprises: one-symbol differential detecting means for outputting a phase difference between a signal received at each point of time with respect to each symbol and a signal received a one-symbol length in the past; multiple differential detecting means having differential phase estimating means for determining a transmitted differential phase signal by using the phase difference signal, phase subtracting means for effecting subtraction between an estimated differential phase signal outputted from the differential phase determining means and the phase difference signal, and convolutional encoding means for providing convolutional encoding of an output of the phase subtracting means, the multiple differential detecting means involving maximum likelihood sequence estimation for effecting decoding a plurality of phase difference signal sequences outputted from the convolutional encoding means by a maximum likelihood sequence estimation algorithm; first mapping means for converting an output of the differential phase estimating means for determining the transmitted differential phase signal into a corresponding bit sequence; second mapping means for converting a phase difference signal output based on a sequence estimation outputted from the multiple differential detecting means involving the maximum likelihood sequence estimation into a corresponding bit sequence; delaying means for causing a timing of the bit sequence outputted from the first mapping means to coincide with a timing of the bit sequence outputted from the second mapping means; bit sequence selecting means for selecting one of the bit sequence outputted from the first mapping means whose timing is adjusted by the delaying means and the bit sequence outputted from the second mapping means in accordance with a predetermined criterion; sync word detecting means for determining the detection or nondetection of a sync word from the bit sequence outputted from the bit sequence selecting means; synchronization controlling means for determining a timing of a received frame, and for controlling, as required, a transmission timing, using information on the sync word detection; and received information extracting means for extracting received information from the bit sequence outputted from the multiple differential detecting means involving the maximum likelihood sequence estimation.

In the digital radiocommunication receiver in accordance with the sixth aspect of the present invention which is configured as described above, an output of the bit sequence selecting means, to which is inputted the bit sequence outputted from the one-symbol differential detecting means, which is a constituent element of the multiple differential detecting means involving the maximum likelihood sequence estimation, or the bit sequence obtained as the output of the multiple differential detection involving the maximum likelihood sequence estimation, is inputted to the sync word detecting means. The sync word detecting means notifies the detection or nondetection of the sync word by using the same. In addition, the bit sequence outputted from the multiple differential detecting means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used. Hence, it is possible to obtain a favorable sync word detection characteristic while maintaining a small bit error rate in received information.

The digital radiocommunication receiver in accordance with a seventh aspect of the present invention is characterized in that, in the digital radiocommunication receiver according to any one of the fourth to sixth aspects of the present invention, a threshold of correlation used by the sync word detecting means is used as the criterion for selection by the bit sequence selecting means.

In the digital radiocommunication receiver in accordance with the seventh aspect of the present invention, in the digital radiocommunication receiver according to any one of the fourth to sixth aspects of the present invention, since the threshold of correlation used by the sync word detecting means is used as the criterion for selection by the bit sequence selecting means, when the threshold of correlation is large, it is possible to obtain a sync word detection characteristic equivalent to that of the case where the demodulating means for a one-symbol unit is used. Meanwhile, when the threshold of correlation is small, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

The digital radiocommunication receiver in accordance with an eighth aspect of the present invention is characterized in that, in the digital radiocommunication receiver according to any one of the fourth to sixth aspects of the present invention, information on the state of frame synchronization is used as the criterion for selection by the bit sequence selecting means.

In the digital radiocommunication receiver in accordance with the eighth aspect of the present invention, in the digital radiocommunication receiver according to any one of the fourth to sixth aspects of the present invention, since information on the state of frame synchronization is used as the criterion for selection by the bit sequence selecting means, in the out-of-frame-synchronized state, i.e., when the threshold of correlation is small, it is possible to obtain a sync word detection characteristic equivalent to that of the case where the demodulating means involving the maximum likelihood sequence estimation is used. Meanwhile, in the frame-synchronized state, i.e., when the threshold of correlation is large, it is possible to obtain a sync word detection characteristic equivalent to that of the case where the demodulating means for a one-symbol unit is used. Hence, it is possible to obtain a favorable sync word detection characteristic while maintaining a small bit error rate in received information.

The digital radiocommunication receiver in accordance with a ninth aspect of the present invention is characterized in that, in the digital radiocommunication receiver according to any one of the fourth to sixth aspects of the present invention, information on a received signal-to-noise ratio obtained separately is used as the criterion for selection by the bit sequence selecting means.

In the digital radiocommunication receiver in accordance with the ninth aspect of the present invention, in the digital radiocommunication receiver according to any one of the fourth to sixth aspects of the present invention, since information on a received signal-to-noise ratio obtained separately is used as the criterion for selection by the bit sequence selecting means, when the received signal-to-noise ratio is small, it is possible to obtain a sync word detection characteristic equivalent to that of the case where the demodulating means for a one-symbol unit is used. Meanwhile, when the received signal-to-noise ratio is large, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

The digital radiocommunication receiver in accordance with a 10th aspect of the present invention is characterized in that, in the digital radiocommunication receiver according to any one of the fourth to sixth aspects of the present invention, information on a received signal level obtained separately is used as the criterion for selection by the bit sequence selecting means.

In the digital radiocommunication receiver in accordance with the 10th aspect of the present invention, in the digital radiocommunication receiver according to any one of the fourth to sixth aspects of the present invention, since information on a received signal level obtained separately is used as the criterion for selection by the bit sequence selecting means, when the received signal level is small, it is possible to obtain a sync word detection characteristic equivalent to that of the case where the demodulating means for a one-symbol unit is used. Meanwhile, when the received signal level is large, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

BRIEF DESCRIPTION OF THE DRAWINGS

The above and other objects and features of the present invention will be more apparent from the following description taken in conjunction with the accompanying drawings.

FIGS. 9A and 9B are diagrams illustrating an example of the configuration of a frame and a burst used in digital radiocommunication;

FIG. 10 is a schematic block diagram illustrating a detector involving maximum likelihood sequence estimation in the conventional digital radiocommunication receiver;

DETAILED DESCRIPTION OF THE PREFERRED EMBODIMENTS

Now, a description will be given of embodiments of the present invention with reference to the accompanying drawings.

(First Embodiment)

Figure 1:
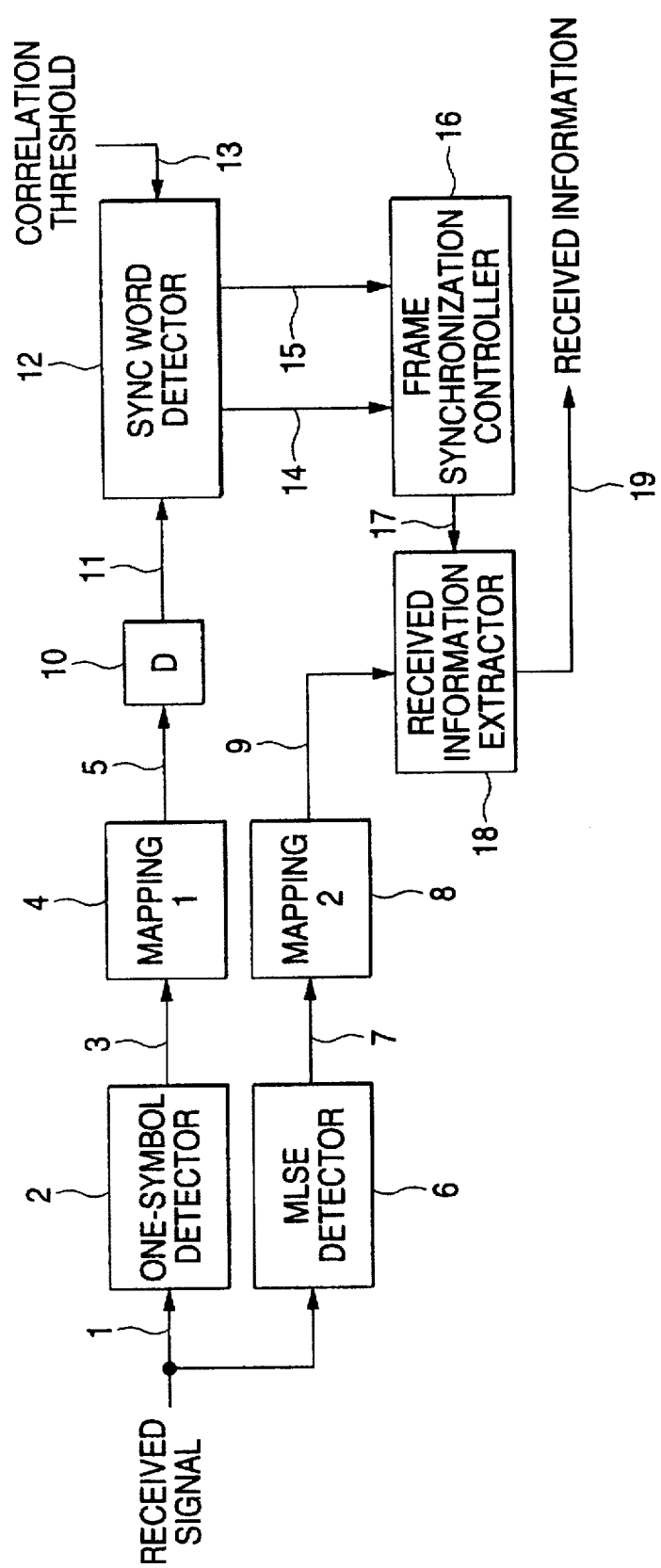
FIG. 1 a schematic block diagram illustrating a first embodiment of the digital radiocommunication receiver in accordance with the present invention.

FIG. 1 is a schematic block diagram illustrating a first embodiment of the present invention. It should be noted that in following embodiments which are described below a description will be given by citing the case where differential PSK is adopted as the modulation scheme.

In the drawing, reference numerals 1, 6, 9, 12 to 19 denote constituent elements similar to those of the conventional receiver. Numeral 2 denotes a detector for a one-symbol unit for detecting the received signal 1 in the unit of one symbol; 3, a differential phase signal detected in the unit of one symbol; 4, a mapping circuit which is a first mapping means for converting the signal outputted from the detector 2 for a one-symbol unit into a received bit sequence; 5, a received bit sequence outputted from the mapping circuit 4; 8, a mapping circuit which is a second mapping means for converting the signal outputted from the detector 6 involving the maximum likelihood sequence estimation into the received bit sequence; 10, a delay element for causing the timing of the bit sequence 5 outputted from the one-symbol differential detector 2 to coincide with the timing of a bit sequence 9 outputted from the detector 6 involving the maximum likelihood sequence estimation; and 11, a one-symbol-detection received bit sequence whose timing is made to coincide with the timing of the bit sequence 9 outputted from the detector 6 involving the maximum likelihood sequence estimation by the delay element 10.

Next, a description will be given of the operation of the first embodiment shown in FIG. 1.

In the drawing, the received signal 1 is inputted to the detector 2 for a one-symbol unit and the detector 6 involving the maximum likelihood sequence estimation. The detector 2 for a one-symbol unit detects the received signal in the unit of one symbol by means of, for example, differential detection, and outputs the differential phase signal 3.

The differential phase signal 3 is inputted to the mapping circuit 4, and a corresponding bit sequence is outputted.

Here, the demodulation means for a one-symbol unit is comprised of the detector 2 for a one-symbol unit and the mapping circuit 4, while the demodulation means involving the maximum likelihood sequence estimation is comprised of the detector 6 involving the maximum likelihood sequence estimation and the mapping circuit 8.

In addition, the detector 6 and the mapping circuit 8 operate in the same way as those of the conventional receiver.

In the first embodiment, the difference with the conventional example lies in that the received signal is passed through the delay element 10 for causing the timing of the output bit sequence 5 in one-symbol-unit detection to coincide with the timing of the bit sequence 9 outputted from the detector 6, and its output 11 is inputted to the sync word detector 12.

The sync word detector 12 operates in the same way as that of the conventional receiver with respect to the bit sequence 11 outputted from the one-symbol-unit detector whose timing is adjusted, and the sync word detector 12 outputs a sync word detection pulse 14 or a sync word nondetection pulse 15. The frame synchronization controller 16 and the received information extractor 18 also operate in the same way as those of the conventional receiver.

Figure 12A:
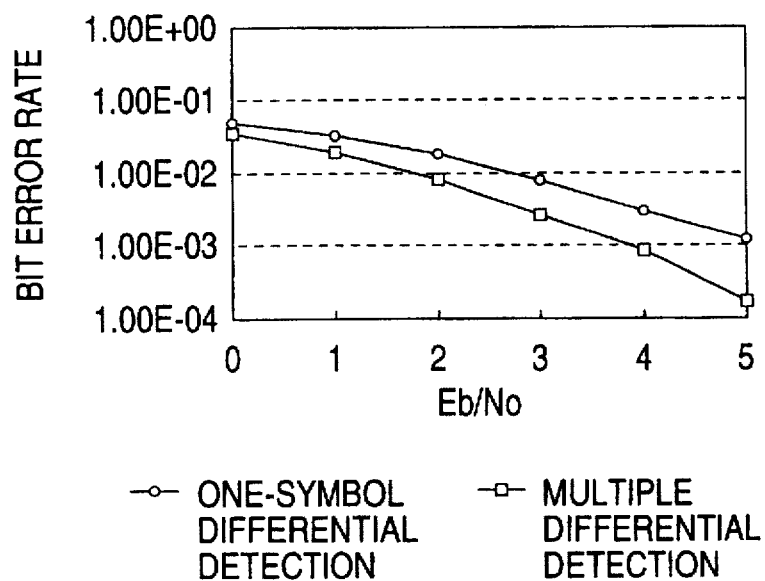
FIGS. 12A and 12B are characteristic diagrams concerning the bit error rate and the probability of sync word nondetection according to a one-symbol differential detection scheme and a multiple differential detection scheme.
Figure 12B:
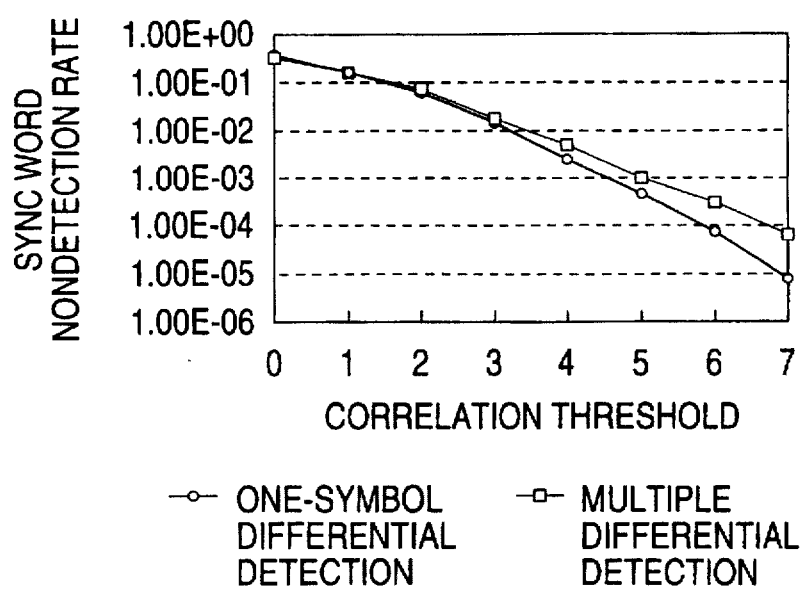
Figure 13:
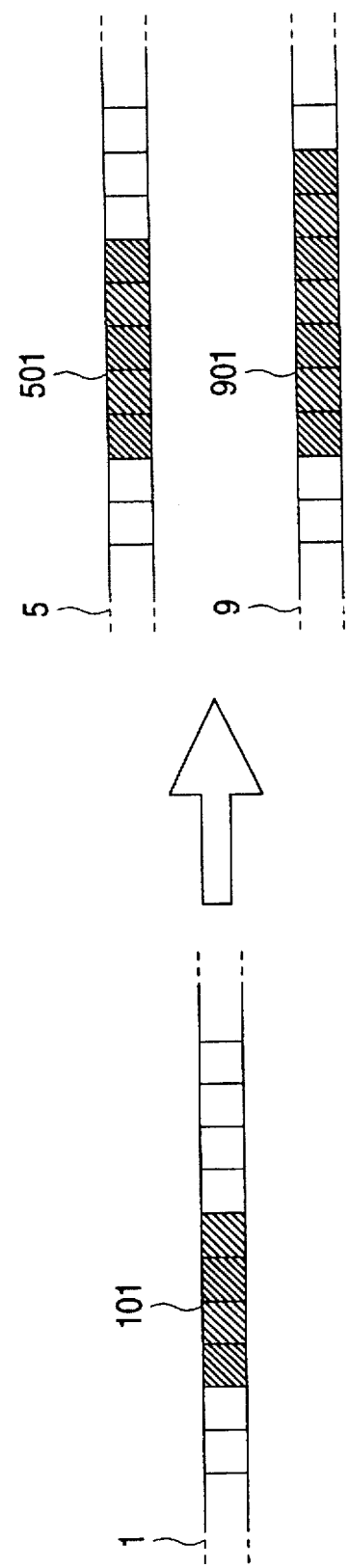
FIG. 13 is a diagram illustrating the effect on the burst error and a demodulation output in a received signal.

In the case where differential detection is used as the detection scheme, as shown in FIG. 12A, the bit error rate under Gaussian noise is smaller in the case of the output bit sequence 9 in multiple differential detection and is superior to that in the case of the output bit sequence 5 in one-symbol differential detection. However, as shown in FIG. 12B, when the threshold of correlation is large, the output bit sequence in one-symbol differential detection yields a smaller probability of nondetection of the sync word with $E_b/N_o$ fixed, and is hence more favorable.

Accordingly, in accordance with the first embodiment, when the threshold of correlation is made large, it is possible to obtain a favorable sync word detection characteristic while maintaining a small bit error rate in the received information.

Incidentally; although in the first embodiment differential detection is used for the demodulation means for a one-symbol unit, it is possible to use a demodulation means which combines either of envelope detection or coherent detection with differential encoding.

In addition, although in the first embodiment differential PSK is used as the demodulation scheme, it is possible to use the differential amplitude phase shift keying (differential APSK). In this case, the difference lies in that the detection outputs 3 and 7 contain not only phase information but also amplitude information.

In addition, although in the first embodiment the delay element 10 is disposed between the mapping circuit 4 and the sync word detector 12, the delay element 10 operates in the same manner irrespective of its disposed position if the delay element 10 is located in the route from the input to the detector 2 for a one-symbol unit up to frame timing information 17.

(Second Embodiment)

Figure 2:
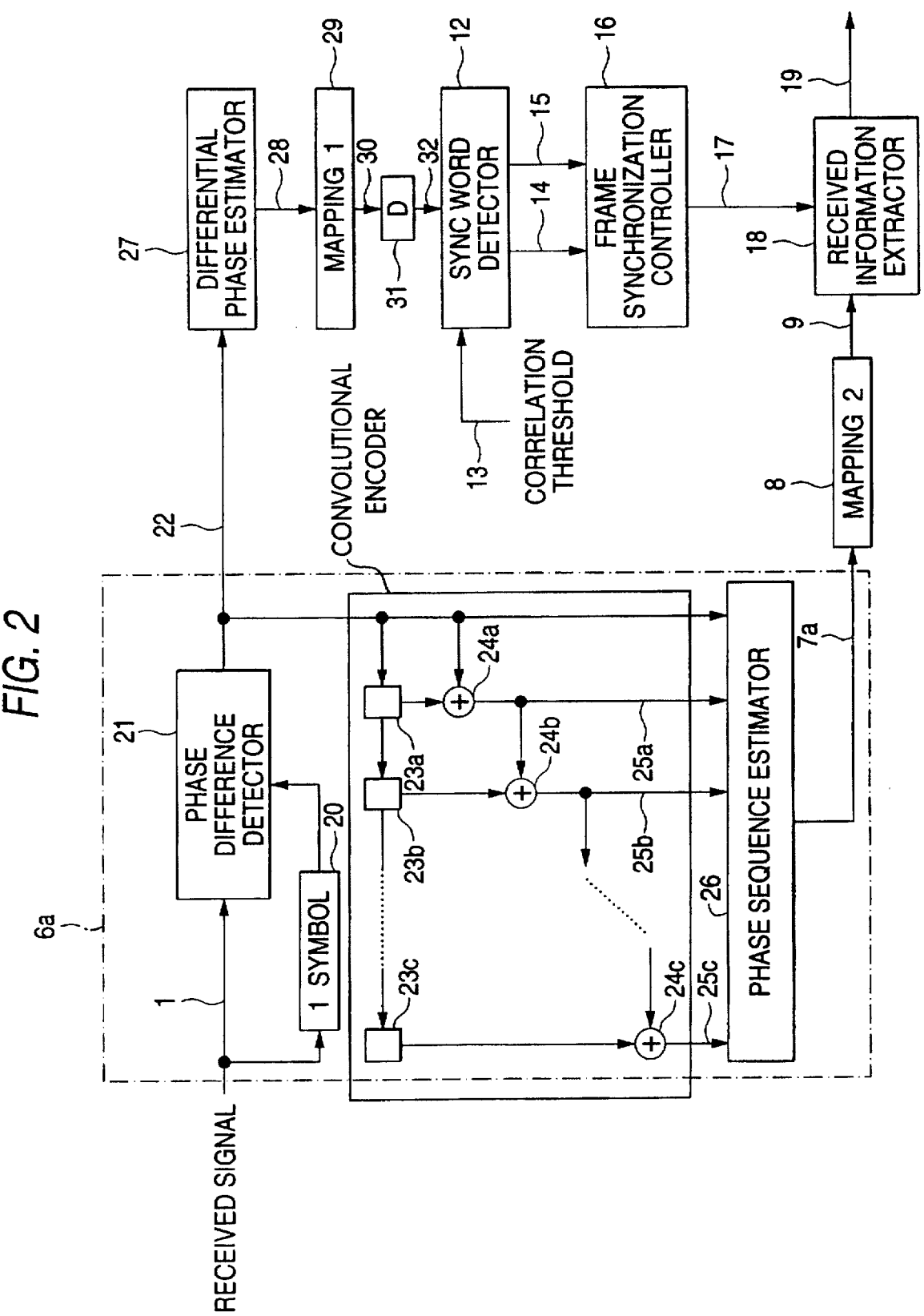
FIG. 2 is a schematic block diagram illustrating a second embodiment of the digital radiocommunication receiver in accordance with the present invention.

FIG. 2 is a schematic block diagram illustrating a second embodiment of the present invention.

In accordance with the first embodiment, it is necessary to separately prepare the detector for a one-symbol unit in addition to the detector involving the maximum likelihood sequence estimation. Depending on the configuration of the demodulation scheme involving the maximum likelihood sequence estimation, however, it is possible to obtain an equivalent output without separately disposing the detector for a one-symbol unit.

In the drawing, reference numerals 1, 8, 9, 12 to 19 denote constituent elements which are similar to those of the first embodiment, and the internal configuration of a detector 6a involving the maximum likelihood sequence estimation is identical to that of the detector 6a in the conventional example shown in FIG. 10.

The following constituent elements are newly provided in FIG. 2: a differential phase estimator 27 for estimating a transmitted differential signal from a phase difference signal 22 which is an output of a one-symbol differential detector 21; an output 28 thereof; a mapping circuit 29 which is the first mapping means for replacing the estimated differential phase signal 28 by a corresponding bit sequence; an output bit sequence 30 thereof; and a delay circuit 31 for causing the timing of the output bit sequence 30 to coincide with the timing of the bit sequence 9 obtained by converting the output of multiple differential detection.

Next, a description will be given of the operation of the second embodiment shown in FIG. 2.

Since the operation of the multiple differential detector 6a in outputting a demodulated differential signal 7a from the received signal 1 is similar to that in Conventional Example 2, a description thereof will be omitted.

The output 22 of the one-symbol differential detector 21 constituting a part of the multiple differential detector 6a is inputted to the differential phase estimator 27. The differential phase estimator 27 estimates the differential phase signal from the phase difference signal 22.

For example, in the case where differential quadrature PSK is adopted, the differential phase estimator 27 selects a value which is the closest to the phase difference signal 22 among 0, $\pi/2$, $\pi$, and $3\pi/2$, and outputs the same as the differential phase signal 28. This output 28 is equivalent to the one-symbol differential detection output 3 in the first embodiment.

The differential phase signal 28 is inputted to the mapping circuit 29, and is converted to the bit sequence 30. Usually, the timing of this output bit sequence 30 does not coincide with the timing of the output bit sequence 9 in multiple differential detection. To allow the two timings to coincide with each other, the delay element 31 delays the output bit sequence 30 in differential phase estimation, and outputs a bit sequence 32 whose timing has been adjusted.

The output bit sequence 32 is inputted to the sync word detector 12. Since the operation of the sync word detector 12, the frame synchronization controller 16, and the received information extractor 18 is similar to that in the case of the conventional receiver, a description thereof will be omitted here.

As described above, in the case where differential PSK is adopted in this second embodiment, it is apparent that an advantage similar to that of the first embodiment can be obtained.

(Third Embodiment)

Figure 3:
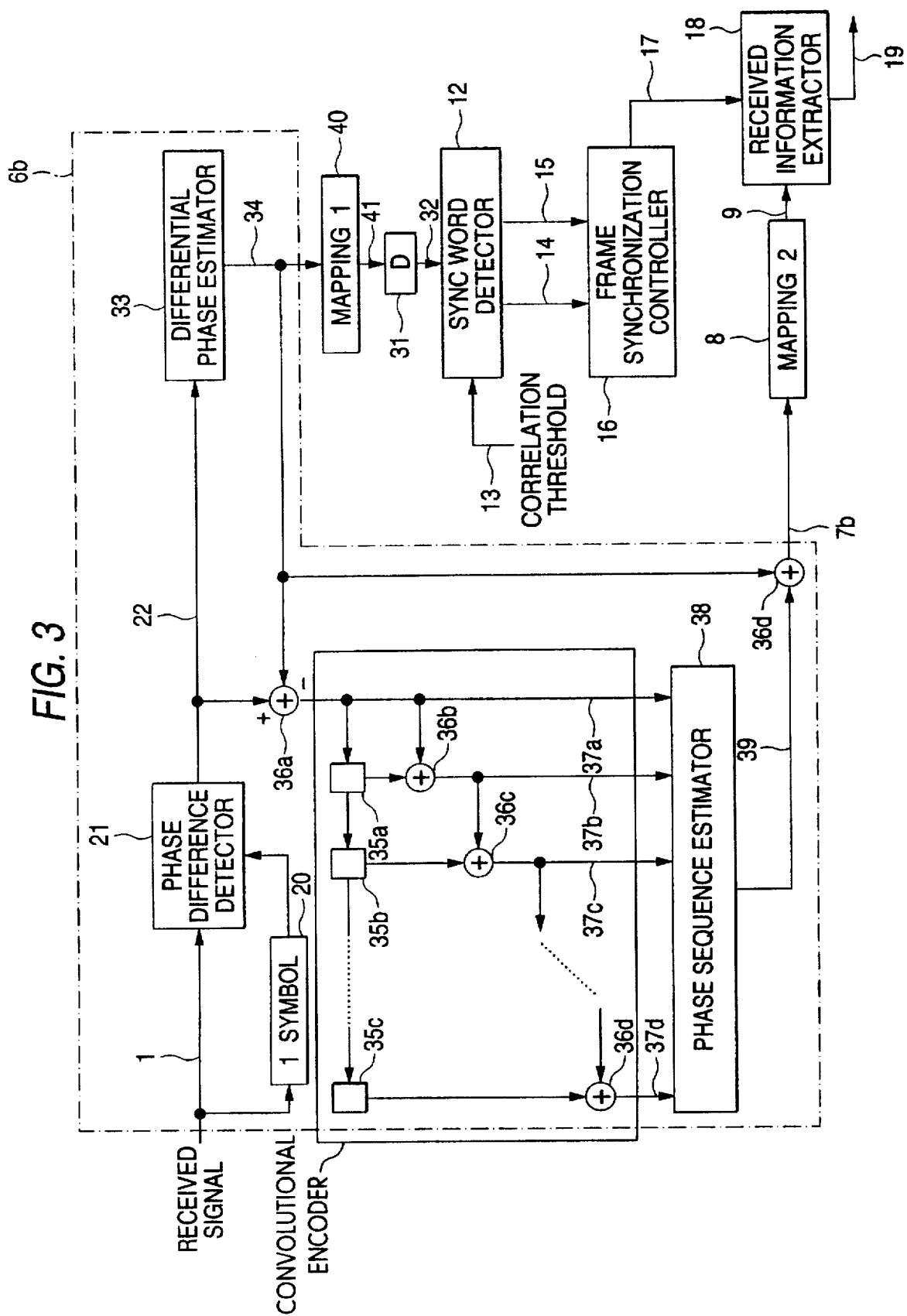
FIG. 3 is a schematic block diagram illustrating a third embodiment of the digital radiocommunication receiver in accordance with the present invention.

FIG. 3 is a schematic block diagram illustrating a third embodiment of the present invention. In the third embodiment, an advantage equivalent to that of the second embodiment can be obtained, but use is made of the fact that the detector involving the maximum likelihood sequence estimation generates the estimated differential phase signal in the one-symbol unit, which reduces the scale of circuits added as compared with the second embodiment.

In the drawing, reference numerals 1, 8, 9, 12 to 19 denote constituent elements which are similar to those of the first embodiment, and the delay element 31 is similar to the one shown in the second embodiment.

Figure 11:
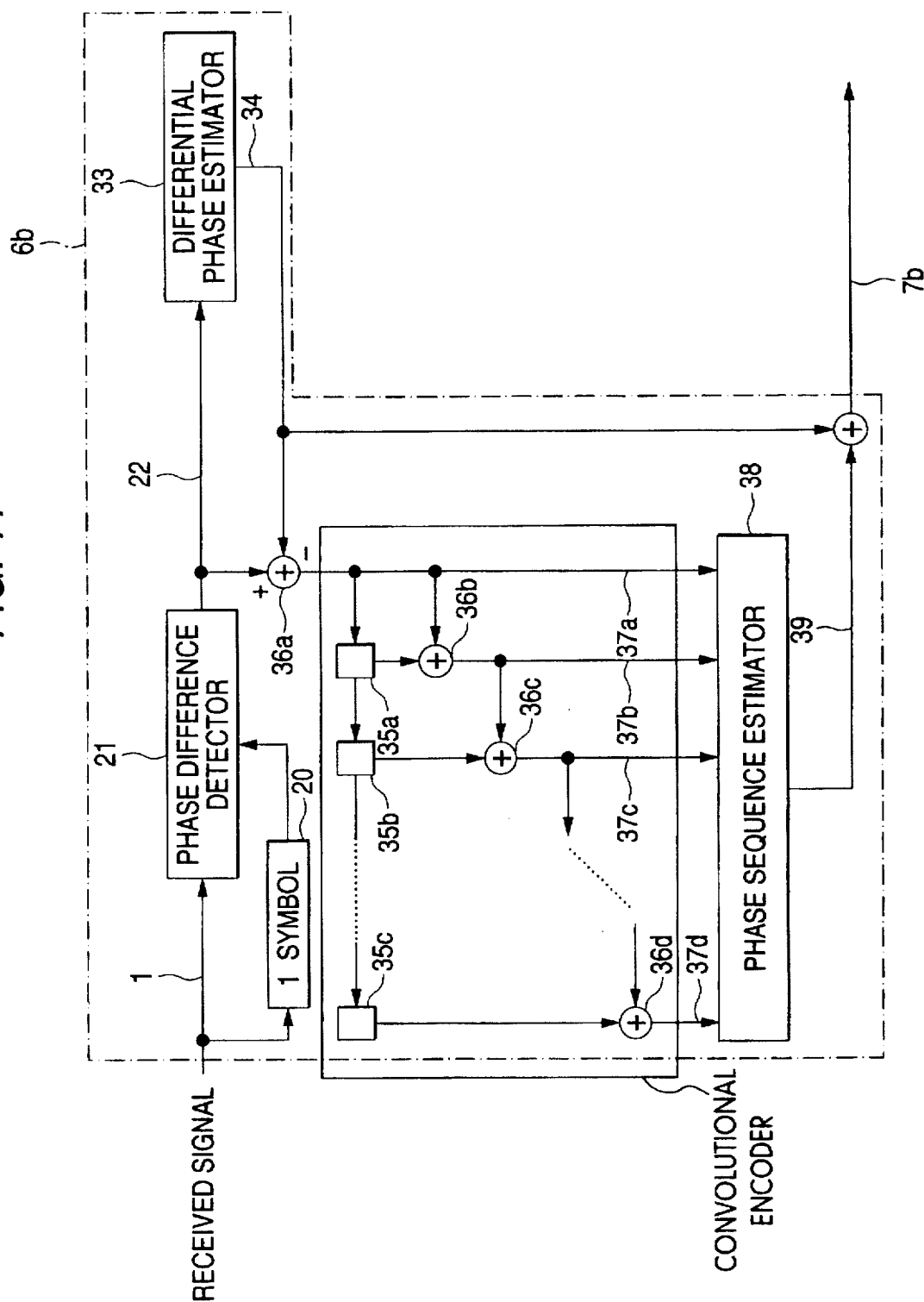
FIG. 11 is a schematic block diagram illustrating a detector involving another maximum likelihood sequence estimation in the conventional digital radiocommunication receiver.

Numerals 6b, 7b, 20 to 22, 33, 34, 35a to 35c, 36a to 36d, 37a to 37d, 38, and 39 denote constituent elements which are similar to those of the conventional receiver shown in FIG. 11.

Numeral 40 denotes a mapping circuit which is the first mapping means for replacing an estimated differential phase signal 34 by a corresponding bit sequence, and numeral 41 denotes an output thereof.

Next, a description will be given of the operation in accordance with the third embodiment with reference to FIG. 3.

Since the operation of the detector 6b from the demodulation of the received signal 1 to the outputting of a demodulated differential phase signal 7b is similar to that of the conventional receiver shown in FIG. 11, a description thereof will be omitted here.

Apart from the operation of the detector 6b, the output 34 of a differential phase estimator 33 in the detector 6b is inputted to the mapping circuit 40 to output the corresponding bit sequence 41.

This bit sequence 41 corresponds to the output bit sequence 5 in one-symbol differential detection in the first embodiment, and is equivalent to the mapping output bit sequence 30 shown in the second embodiment. Accordingly, the operation which begins with the delay element 31 up to the operation of outputting received information 19 is similar to that of the same portion in the second embodiment.

(Fourth Embodiment)

Figure 4:
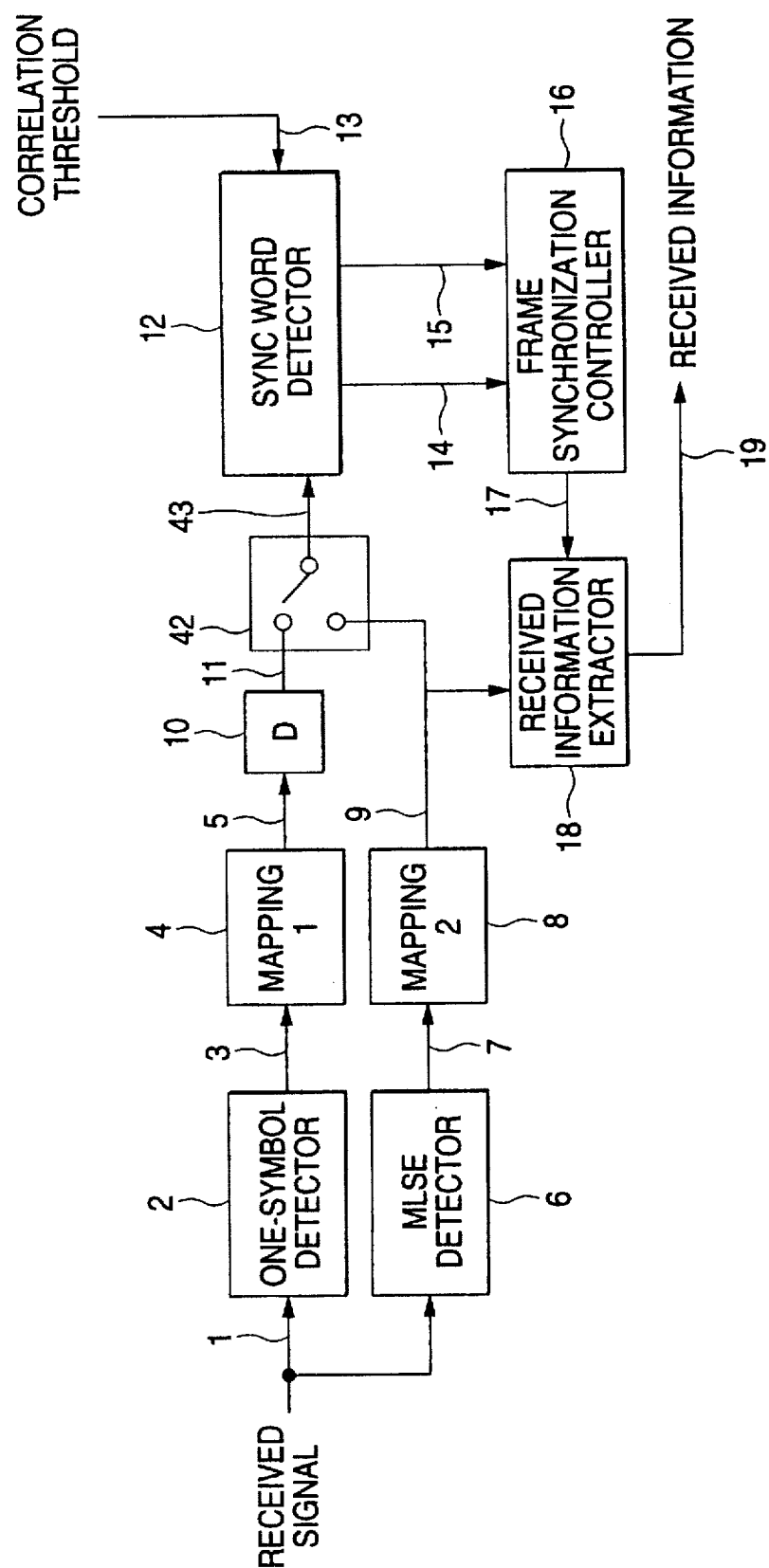
FIG. 4 is a schematic block diagram illustrating a fourth embodiment of the digital radiocommunication receiver in accordance with the present invention.

FIG. 4 is a schematic block diagram illustrating a fourth embodiment of the present invention.

In all the first to third embodiments described above, the output bit sequence in multiple differential detection involving the maximum likelihood sequence estimation is inputted to the received information extractor, and the output bit sequence in one-symbol differential detection is inputted to the sync word detector.

However, as can be seen from FIG. 12B, when the threshold of correlation is small under Gaussian noise, the output bit sequence in multiple differential detection yields a smaller probability of nondetection of the sync word than the output bit sequence in one-symbol differential detection.

Moreover, the point where the aforementioned characteristic intersects changes by a received signal-to-noise ratio (hereafter referred to as the received SNR) which has a directly proportional relationship to $E_b/N_o$ which has already been described.

In the fourth embodiment, the bit sequence inputted to the sync word detector is not fixed, and is switched in accordance with a predetermined criterion, so as to obtain a favorable sync word detection characteristic while maintaining a small bit error rate in received information.

In FIG. 4, a selection circuit 42 is provided for selecting either the bit sequence 9 outputted from the detector 6 involving the maximum likelihood sequence estimation or the bit sequence 11 outputted from the detector 2 for a one-symbol unit and passed through the delay element 10 in accordance with a predetermined criterion for selection, and for outputting a selected bit sequence 43. As for the remaining portions, the same constituent elements as those of the first embodiment shown in FIG. 1 are provided.

In the fourth embodiment as well, a description will be given of the case in which differential PSK is adopted.

Next, a description will be given of the operation of the fourth embodiment by referring to FIG. 4.

Since the operation up to the generation from the received signal 1 of the bit sequence 9 outputted from the detector 6 for multiple differential detection involving the maximum likelihood sequence estimation and of the bit sequence 11 outputted from the detector 2 for one-symbol differential detection and passed through the delay element 10 is similar to that in the first embodiment, a description thereof will be omitted here.

The aforementioned output bit sequence 9 and the output bit sequence 11 are inputted to the selection circuit 42, and the selection circuit 42 selects either of the aforementioned two bit sequences in accordance with a predetermined criterion such as a threshold 13 of sync word correlation detection.

As shown in FIG. 12B, when the threshold of correlation is large, the probability of nondetection of the sync word having the same sync word bit length under the same $E_b/N_o$ is smaller in the case of the output bit sequence in one-symbol differential detection, and its sync word detection characteristic is superior. However, when the threshold of correlation is small, the output bit sequence in multiple differential detection yields a smaller probability of nondetection of the sync word, and is hence more favorable.

The reason for this is that when the threshold of correlation is small, the sync word is not detected even at a small bit error, so that the effect of a burst error, such as the one explained in Conventional Example 3, does not present a problem. This tendency is noticeable as $E_b/N_o$ becomes large.

In such a case, the output of multiple differential detection, which exhibits a small bit error rate in the environment of Gaussian noise, yields a smaller probability of nondetection of the sync word, and its sync word detection characteristic is more favorable.

Now, if it is assumed that the noise environment is such that the sync word nondetection probability is the one shown in FIG. 12B, it suffices if the threshold of correlation is set as the criterion for selecting the bit sequence in such a manner as to select the output bit sequence in multiple differential detection when the threshold of correlation is 1 bit or less, and to select the output bit sequence in one-symbol differential detection when the threshold of correlation is 2 bits or more.

The selected bit sequence 43 is inputted to the sync word detector 12.

Since the operation of the sync word detector 12, the frame synchronization controller 16, and the received information extractor 18 is similar to that of the first embodiment, a description thereof will be omitted.

Incidentally, although in the fourth embodiment differential detection is used for the demodulation means for a one-symbol unit, it is possible to use a demodulation means which combines either of envelope detection or coherent detection with differential encoding.

In addition, although in the fourth embodiment differential PSK is used as the demodulation scheme, it is possible to use the differential amplitude phase shift keying (differential APSK). An output in this case is similar to the contents described in the first embodiment.

In addition, although in the fourth embodiment the delay element 10 is disposed between the mapping circuit 4 and the sync word detector 12, the delay element 10 operates in the same manner irrespective of its disposed position if the delay element 10 is located in the route from the input to the detector 2 for a one-symbol unit up to the input to the selection circuit 42.

(Fifth Embodiment)

Figure 5:
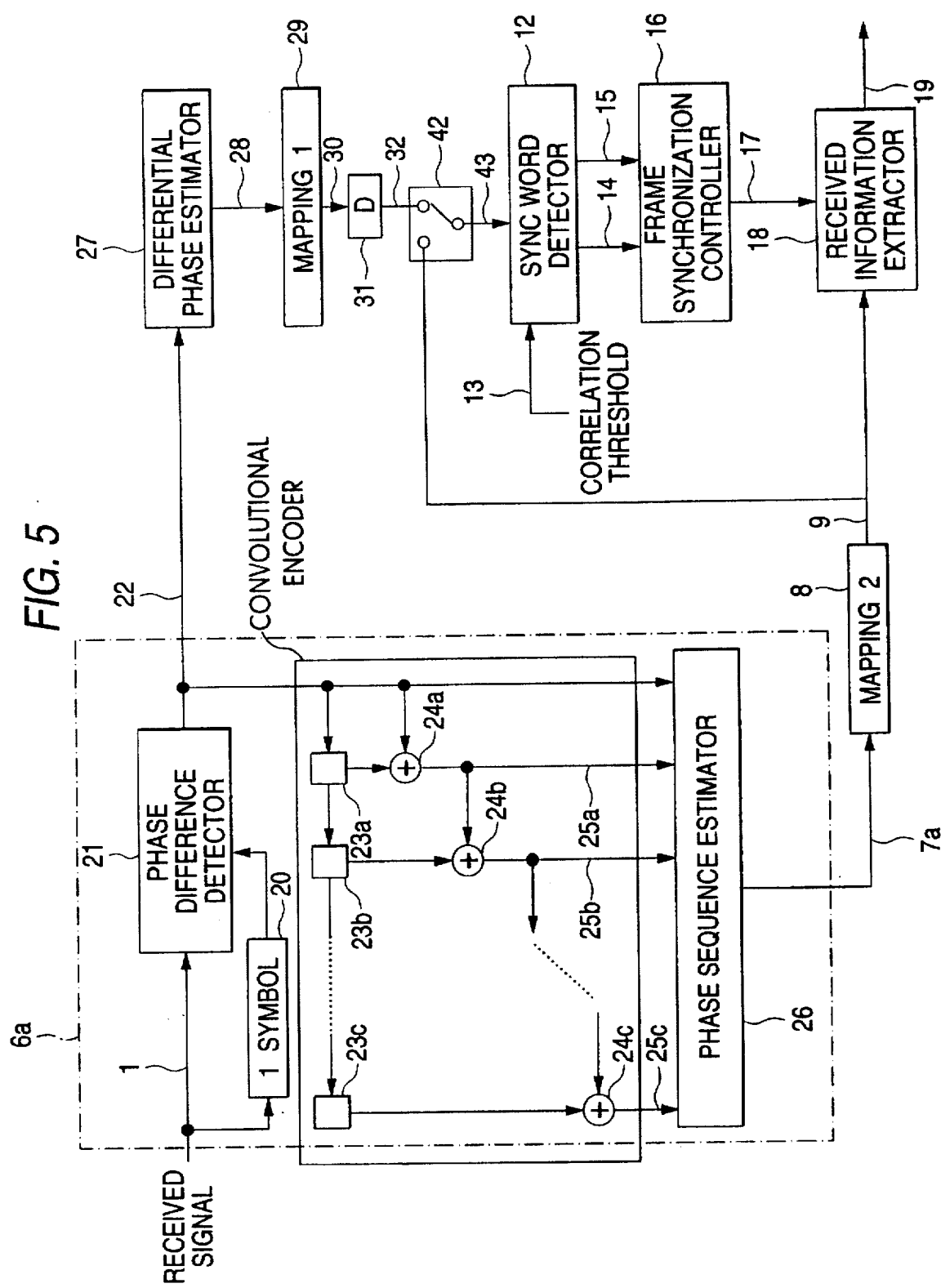
FIG. 5 is a schematic block diagram illustrating a fifth embodiment of the digital radiocommunication receiver in accordance with the present invention.

FIG. 5 is a schematic block diagram illustrating a fifth embodiment of the present invention.

In accordance with the configuration of the fourth embodiment, it is necessary to separately prepare the detector for a one-symbol unit in addition to the detector involving the maximum likelihood sequence estimation. Depending on the configuration of the demodulation scheme involving the maximum likelihood sequence estimation, however, it is possible to obtain an equivalent output without separately disposing the detector for a one-symbol unit.

The fifth embodiment shows an example of such a configuration.

In this fifth embodiment as well, the case is considered in which differential PSK is adopted as the demodulation scheme in the same way as in the fourth embodiment.

In FIG. 5, reference numeral 42 denotes a selection circuit similar to the one shown in the fourth embodiment, and the other constituent elements are similar to those of the second embodiment.

Next, referring to FIG. 5, a description will be given of the operation of this fifth embodiment.

The operation up to the generation of the bit sequence 9 outputted from the detector for multiple differential detection and the bit sequence 32 outputted from the differential phase estimator and passed through the delay element 31 is similar to that in the second embodiment.

The bit sequence 9 outputted from the detector for multiple differential detection and the bit sequence 32 outputted from the differential phase estimator are inputted to the selection circuit 42. The selection circuit 42 selects either of the aforementioned two bit sequences by using the threshold 13 of sync word correlation detection as a criterion.

The operation of the sync word detector 12, the frame synchronization controller 16, and the received information extractor 18 is utterly the same as that of the examples hitherto described.

Through the operation of the above-described constituent elements, in accordance with the fifth embodiment it is possible to obtain an advantage similar to that of the fourth embodiment in the case where differential PSK is adopted.

(Sixth Embodiment)

Figure 6:
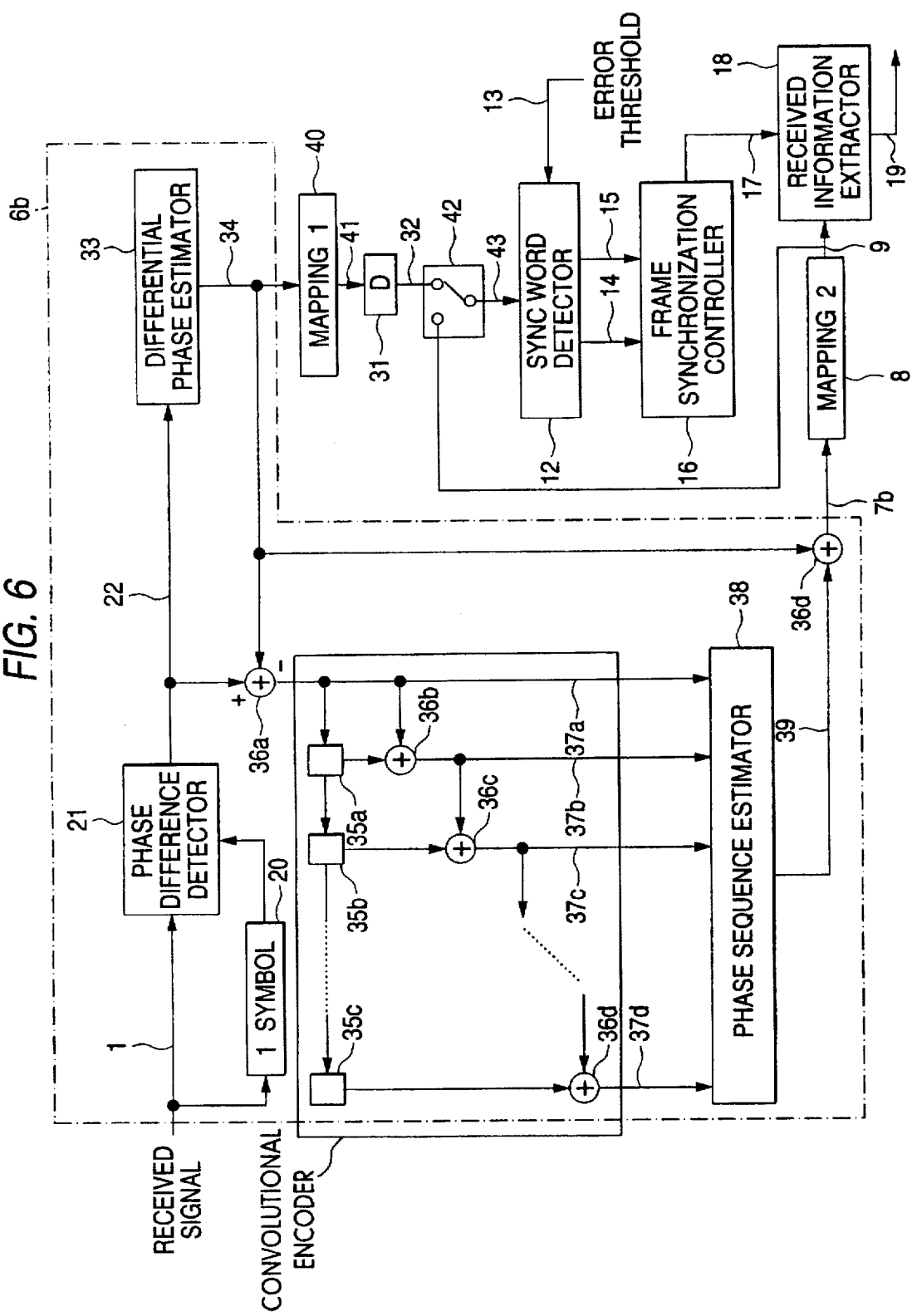
FIG. 6 is a schematic block diagram illustrating a sixth embodiment of the digital radiocommunication receiver in accordance with the present invention.

FIG. 6 is a schematic block diagram illustrating a sixth embodiment of the present invention.

In accordance with the sixth embodiment, an advantage equivalent to that of the fifth embodiment can be obtained, but use is made of the fact that the detector involving the maximum likelihood sequence estimation generates the estimated differential phase signal in the one-symbol unit, which aims at a reduction in the scale of circuits added as compared with the fifth embodiment.

The constituent elements shown in FIG. 6 are utterly the same as the configuration of the third embodiment shown in FIG. 3 except that the selection circuit 42 is provided for selecting either the bit sequence 32 generated from the estimated differential phase signal or the bit sequence 9 generated from the output of multiple differential detection involving the maximum likelihood sequence estimation in accordance with a predetermined criterion for selection.

As for the operation of this sixth embodiment, the operation of the selection circuit 42 is similar to that of the fifth embodiment, and the operation of the other constituent elements is similar to that of the third embodiment, so that a description thereof will be omitted.

(Seventh Embodiment)

In the above-described fourth to sixth embodiments, an example has been shown in which the threshold 13 of correlation in sync word detection is used as the criterion for selection by the selection circuit 42, i.e., the means for selecting a bit sequence, but information on the state of frame synchronization may be used as the criterion for selection.

Figure 7A:
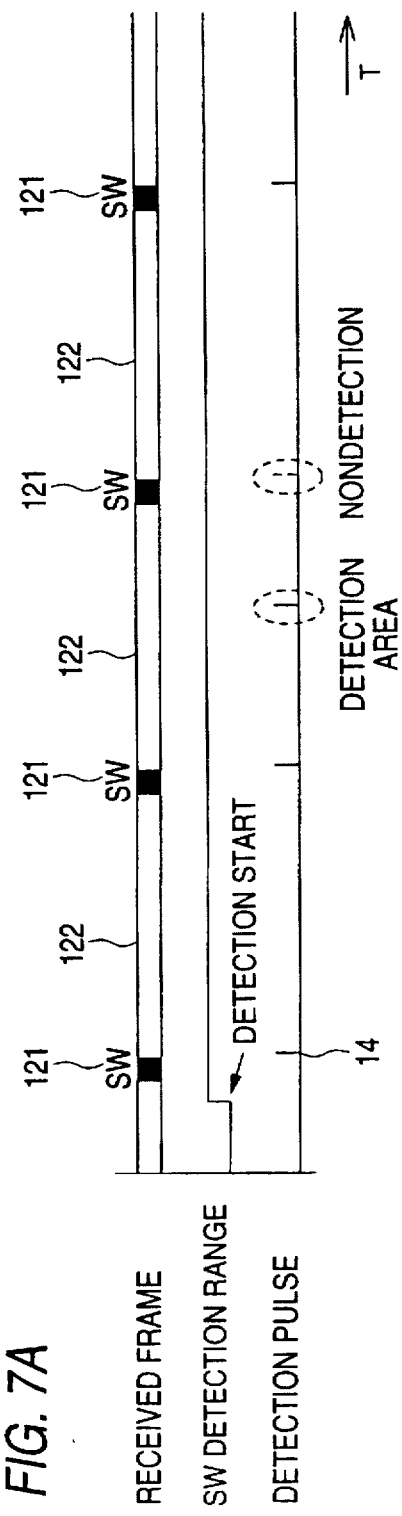
FIGS. 7A and 7B are diagrams explaining the operation of sync word detection in the out-of-synchronization state and in the synchronized state.

In an out-of-frame-synchronized state, the sync word is generally searched without limiting the scope, as shown in FIG. 7A. At this time, the threshold of correlation is normally set to a small value to minimize the number of false detection.

Figure 7B:
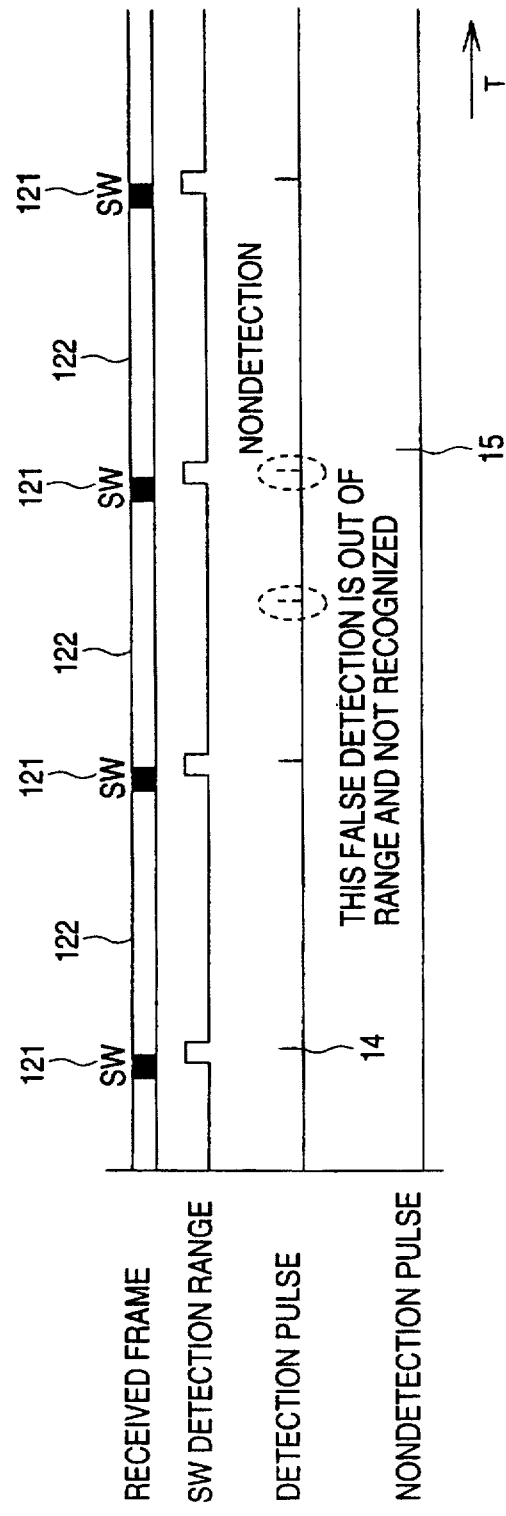
Figure 8:
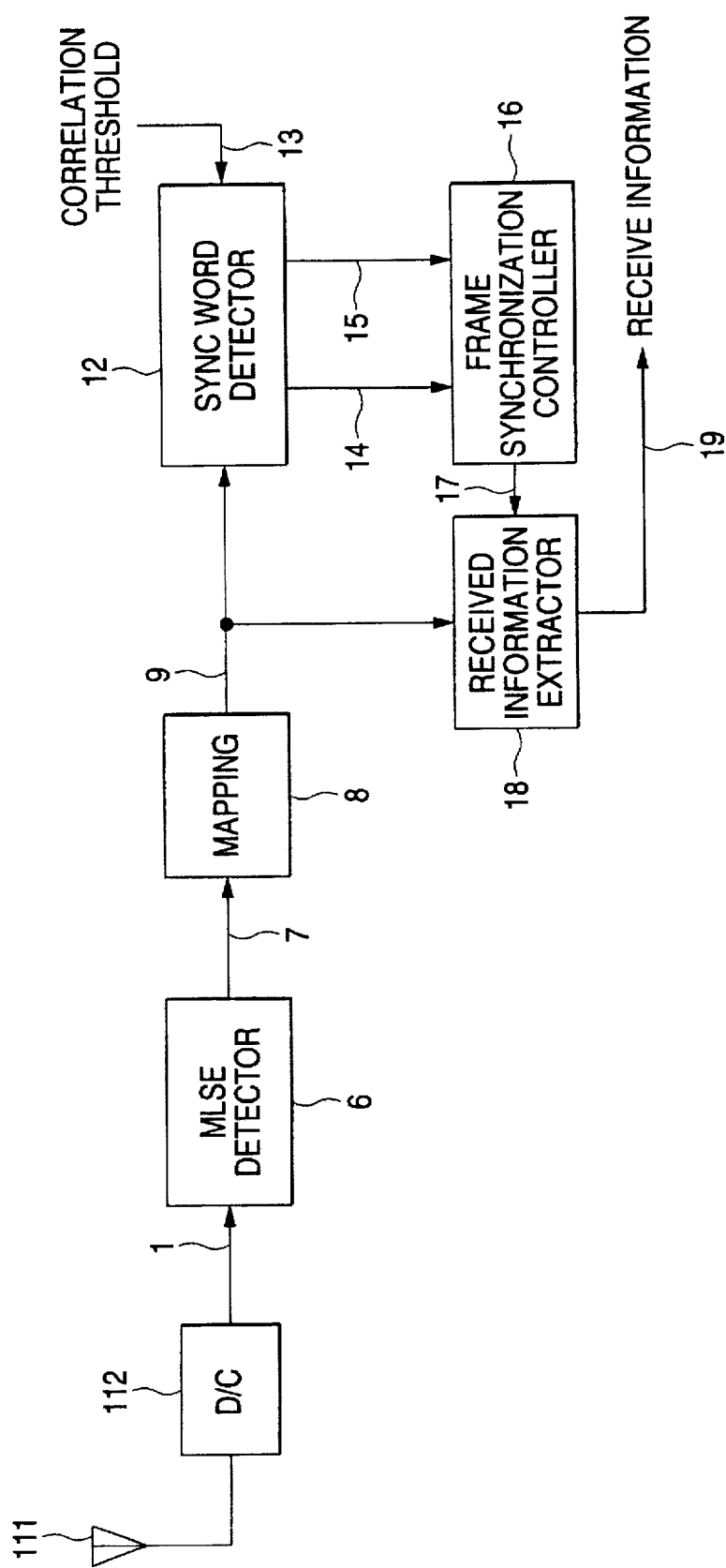
FIG. 8 is a schematic block diagram illustrating a conventional digital radiocommunication receiver based on a demodulation scheme involving maximum likelihood sequence estimation.

Meanwhile, in a frame-synchronized state, since the position of the sync word can be approximately estimated, the scope of searching the sync word is limited as shown in FIG. 7B, and the threshold of correlation is set to a large value to reduce nondetection.

Accordingly, an advantage equivalent to those of the fourth to sixth embodiments can be obtained by using the information on the state of frame synchronization as the criterion for selection. It suffices if such information is outputted from the frame synchronization controller 16.

Alternatively, the received SNR or a combination of the received SNR and the aforementioned threshold of correlation may be used as the criterion for selection by the selection circuit 42, i.e., the means for selecting a bit sequence.

If a sufficiently high received SNR is obtained, the burst errors can be reduced, with the result that the probability of nondetection of the sync word becomes smaller in the case of the output bit sequence in the multiple differential detection involving the maximum likelihood sequence estimation even when the threshold of correlation is large.

Here, the received SNR can be obtained by, for example, determining a bit error rate from a known bit sequence in the received signal and by converting the same. This bit error rate may be used as the criterion for selection.

Hereafter, examples are illustrated in which, as the criterion for selection, the received SNR is used and the combination of the received SNR and the threshold of correlation is used.

In the fourth to sixth embodiments, in the case where the received SNR is used as the criterion for selection, it suffices if the output bit sequence in the one-symbol differential detection is selected as the input to the sync word detector if the received SNR is less than a predetermined value, and the output bit sequence, in multiple differential detection involving the maximum likelihood sequence estimation is selected if the received SNR is greater than or equal to the predetermined value.

On the other hand, in the fourth to sixth embodiments, in the case where the combination of the received SNR and the threshold of correlation is used as the criterion for selection, it suffices if, in a case where the received SNR is less than, for example, 6 dB, the output bit sequence in the multiple differential detection involving the maximum likelihood sequence estimation is selected only when the threshold of correlation is 0 bit, and the output bit sequence in the one-symbol differential detection is selected when the threshold of correlation is greater than or equal to 1 bit. Then, in a case where the received SNR is greater than or equal to 6 dB and less than 9 dB, 2 bits is used as the criterion for the aforementioned switchover, and in a case where the received SNR is greater than or equal to 9 dB and less than 12 dB, 3 bits is used as the criterion for switchover. If the operation is effected in this manner, it is possible to carry out sync word detection with high accuracy.

Furthermore, information on the received signal level may be used as the criterion for selection by the selection circuit 42, i.e., the means for selecting a bit sequence.

If a sufficiently high level of the received signal is being obtained, it can be evaluated that the situation is equivalent to the fact that a high received SNR is being obtained, so that the burst errors are reduced. Consequently, when the threshold of correlation is large, the output based on the demodulation scheme involving the maximum likelihood sequence estimation yields a smaller probability of nondetection of the sync word, that is, its sync word detection characteristic is more favorable.

The information on the received signal level is obtained by, for example, inserting a nonmodulated signal in the received signal and by detecting the same.

In accordance with the first aspect of the present invention, the bit sequence outputted from the demodulating means for a one-symbol unit is inputted to the sync word detecting means, and the sync word detecting means notifies the detection or nondetection of the sync word by using the same. In addition, the bit sequence outputted from the demodulating means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

In accordance with the second aspect of the present invention, the bit sequence obtained as the output of the one-symbol differential detecting means, which is a constituent element of the multiple differential detecting means involving the maximum likelihood sequence estimation, is inputted to the sync word detecting means, and the sync word detecting means notifies the detection or nondetection of the sync word by using the same. In addition, the bit sequence obtained as the output of the multiple differential detecting means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

In accordance with the third aspect of the present invention, the bit sequence obtained as the output of the one-symbol differential detecting means, which is a constituent element of the multiple differential detecting means involving the maximum likelihood sequence estimation, is inputted to the sync word detecting means. The sync word detecting means notifies the detection or nondetection of the sync word by using the same. In addition, the bit sequence obtained as the output of the multiple differential detecting means involving the maximum likelihood sequence estimation is inputted to the received information extracting means. Accordingly, it is possible to obtain a bit error rate equivalent to that of a case where the demodulating means involving the maximum likelihood sequence estimation is used, and it is possible to obtain a sync word detection characteristic equivalent to a case where the demodulating means for a one-symbol unit is used. Hence, it is possible to obtain a favorable sync word detection characteristic while maintaining a small bit error rate in received information.

In accordance with the fourth aspect of the present invention, an output of the bit sequence selecting means, to which is inputted the bit sequence outputted from the demodulating means for a one-symbol unit or the bit sequence outputted from the demodulating means involving the maximum likelihood sequence estimation, is inputted to the sync word detecting means. The sync word detecting means notifies the detection or nondetection of the sync word by using the same. In addition, the bit sequence outputted from the demodulating means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used. Hence, it is possible to obtain a favorable sync word detection characteristic while maintaining a small bit error rate in received information.

In accordance with the fifth aspect of the present invention, an output of the bit sequence selecting means, to which is inputted the bit sequence obtained as the output of the one-symbol differential detecting means, which is a constituent element of the multiple differential detecting means involving the maximum likelihood sequence estimation, or the bit sequence as the output of the multiple differential detecting means involving the maximum likelihood sequence estimation, is inputted to the sync word detecting means. The sync word detecting means notifies the detection or nondetection of the sync word by using the same. In addition, the bit sequence outputted from the multiple differential detecting means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used. Hence, it is possible to obtain a favorable sync word detection characteristic while maintaining a small bit error rate in received information.

In accordance with the sixth aspect of the present invention, an output of the bit sequence selecting means, to which is inputted the bit sequence outputted from the one-symbol differential detecting means, which is a constituent element of the multiple differential detecting means involving the maximum likelihood sequence estimation, or the bit sequence obtained as the output of the multiple differential detection involving the maximum likelihood sequence estimation, is inputted to the sync word detecting means. The sync word detecting means notifies the detection or nondetection of the sync word by using the same. In addition, the bit sequence outputted from the multiple differential detecting means involving the maximum likelihood sequence estimation is inputted to the received information extracting means. Accordingly, it is possible to obtain a bit error rate equivalent to that of a case selected from the case where the demodulating means involving the maximum likelihood sequence estimation is used and the case where the demodulating means for a one-symbol unit is used.

Hence, it is possible to obtain a favorable sync word detection characteristic while maintaining a small bit error rate in received information.

In accordance with the seventh aspect of the present invention, in the digital radiocommunication receiver according to any one of the fourth to sixth aspects of the present invention, since the threshold of correlation used by the sync word detecting means is used as the criterion for selection by the bit sequence selecting means, when the threshold of correlation is large, it is possible to obtain a sync word detection characteristic equivalent to that of the case where the demodulating means for a one-symbol unit is used. Meanwhile, when the threshold of correlation is small, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

In accordance with the eighth aspect of the present invention, in the digital radiocommunication receiver according to any one of the fourth to sixth aspects of the present invention, since information on the state of frame synchronization is used as the criterion for selection by the bit sequence selecting means, in the out-of-frame-synchronized state, i.e., when the threshold of correlation is small, it is possible to obtain a sync word detection characteristic equivalent to that of the case where the demodulating means involving the maximum likelihood sequence estimation is used. Meanwhile, in the frame-synchronized state, i.e., when the threshold of correlation is large, it is possible to obtain a sync word detection characteristic equivalent to that of the case where the demodulating means for a one-symbol unit is used. Hence, it is possible to obtain a favorable sync word detection characteristic while maintaining a small bit error rate in received information.

In accordance with the ninth aspect of the present invention, in the digital radiocommunication receiver according to any one of the fourth to sixth aspects of the present invention, since information on a received signal-to-noise ratio obtained separately is used as the criterion for selection by the bit sequence selecting means, when the received signal-to-noise ratio is small, it is possible to obtain a sync word detection characteristic equivalent to that of the case where the demodulating means for a one-symbol unit is used. Meanwhile, when the received signal-to-noise ratio is large, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

In accordance with the 10th aspect of the present invention, in the digital radiocommunication receiver according to any one of the fourth to sixth aspects of the present invention, since information on a received signal level obtained separately is used as the criterion for selection by the bit sequence selecting means, when the received signal level is small, it is possible to obtain a sync word detection characteristic equivalent to that of the case where the demodulating means for a one-symbol unit is used. Meanwhile, when the received signal level is large, it is possible to obtain a sync word detection characteristic equivalent to that of the case where the demodulating means involving the maximum likelihood sequence estimation is used. Hence, it is possible to obtain a favorable sync word detection characteristic while maintaining a small bit error rate in received information.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A digital radiocommunication receiver, comprising:

demodulation means for a one-symbol unit for detecting a received signal in a unit of one symbol and for outputting a received bit sequence;

demodulation means involving maximum likelihood sequence estimation for outputting a received bit sequence from a received signal sequence concerning a plurality of symbols;

sync word detecting means for determining the detection or nondetection of a sync word from the received bit sequence outputted from said demodulating means for a one-symbol unit, a timing of said bit sequence being made to coincide with a timing of the bit sequence outputted from said demodulating means involving the maximum likelihood sequence estimation;

synchronization controlling means for determining a timing of a received frame, and for controlling, as required, a transmission timing, using information on the sync word detection pulse; and received information extracting means for extracting received information from an output of said demodulating means involving the maximum likelihood sequence estimation, based on the timing of the received frame determined by said synchronization controlling means.

2. A digital radiocommunication receiver, comprising:

one-symbol differential detecting means for outputting a phase difference between a signal received at each point of time with respect to each symbol and a signal received a one-symbol length in the past;

multiple differential detecting means having convolutional encoding means for providing convolutional encoding with respect to the phase difference signal, said multiple differential detecting means involving maximum likelihood sequence estimation for effecting decoding a plurality of phase difference signal sequences outputted from the convolutional encoding means by a maximum likelihood sequence estimation algorithm;

differential phase estimating means for estimating a differential phase signal from the phase difference signal outputted from said one-symbol differential detecting means;

first mapping means for converting an output of said differential phase estimating means into a corresponding bit sequence;

second mapping means for converting a phase difference signal output based on a sequence estimation outputted from said multiple differential detecting means involving the maximum likelihood sequence estimation into a corresponding bit sequence;

sync word detecting means for determining the detection or nondetection of a sync word from the bit sequence outputted from said first mapping means, a timing of said bit sequence being made to coincide with a timing of the bit sequence outputted from said second mapping means;

synchronization controlling means for determining a timing of a received frame, and for controlling, as required, a transmission timing, using information on the sync word detection pulse; and received information extracting means for extracting received information from the bit sequence outputted from said multiple differential detecting means involving the maximum likelihood sequence estimation, based on the timing of the received frame determined by said synchronization controlling means.

3. A digital radiocommunication receiver, comprising:

one-symbol differential detecting means for outputting a phase difference between a signal received at each point of time with respect to each symbol and a signal received a one-symbol length in the past; multiple differential detecting means having differential phase estimating means for determining a transmitted differential phase signal by using the phase difference signal, phase subtracting means for effecting subtraction between an estimated differential phase signal outputted from said differential phase estimating means and said phase difference signal, and convolutional encoding means for providing convolutional encoding with respect to an output of said phase subtracting means, said multiple differential detecting means involving maximum likelihood sequence estimation for effecting decoding a plurality of phase difference signal sequences outputted from the convolutional encoding means by a maximum likelihood sequence estimation algorithm;

first mapping means for converting an output of said differential phase estimating means into a corresponding bit sequence;

second mapping means for converting a phase difference signal output based on a sequence estimation outputted from said multiple differential detecting means involving the maximum likelihood sequence estimation into a corresponding bit sequence;

sync word detecting means for determining the detection or nondetection of a sync word from the bit sequence outputted from said first mapping means, a timing of said bit sequence being made to coincide with a timing of the bit sequence outputted from said second mapping means;

synchronization controlling means for determining a timing of a received frame, and for controlling, as required, a transmission timing, using information on the sync word detection pulse; and received information extracting means for extracting received information from the bit sequence outputted from said multiple differential detecting means involving the maximum likelihood sequence estimation, based on the timing of the received frame determined by said synchronization controlling means.

4. A digital radiocommunication receiver, comprising:

demodulation means for a one-symbol unit for detecting a received signal in a unit of one symbol and for outputting a received bit sequence;

demodulation means involving maximum likelihood sequence estimation for outputting a received bit sequence from a received signal sequence concerning a plurality of symbols;

delaying means for causing a timing of the bit sequence outputted from said demodulating means for a one-symbol unit to coincide with a timing of the bit sequence outputted from said demodulating means involving the maximum likelihood sequence estimation;

bit sequence selecting means for selecting one of the bit sequence outputted from said demodulating means for a one-symbol unit whose timing is adjusted by said delaying means and the bit sequence outputted from said demodulating means involving the maximum likelihood sequence estimation in accordance with a predetermined criterion;

sync word detecting means for determining the detection or nondetection of a sync word from the bit sequence outputted from said bit sequence selecting means;

synchronization controlling means for determining a timing of a received frame, and for controlling, as required, a transmission timing, using information on the sync word detection pulse; and received information extracting means for extracting received information from the bit sequence outputted from said demodulating means involving maximum likelihood sequence estimation, based on the timing of the received frame determined by said synchronization controlling means.

5. A digital radiocommunication receiver according to claim 4, wherein a threshold of correlation used by said sync word detecting means is used as the criterion for selection by said bit sequence selecting means.

6. A digital radiocommunication receiver according to claim 4, wherein information on a state of frame synchronization is used as the criterion for selection by said bit sequence selecting means.

7. A digital radiocommunication receiver according to claim 4, wherein information on a received signal-to-noise ratio obtained separately is used as the criterion for selection by said bit sequence selecting means.

8. A digital radiocommunication receiver according to claim 4, wherein information on a received signal level obtained separately is used as the criterion for selection by said bit sequence selecting means.

9. A digital radiocommunication receiver, comprising:

one-symbol differential detecting means for outputting a phase difference between a signal received at each point of time with respect to each symbol and a signal received a one-symbol length in the past;

multiple differential detecting means having convolutional encoding means for providing convolutional encoding with respect to the phase difference signal, said multiple differential detecting means involving maximum likelihood sequence estimation for effecting decoding a plurality of phase difference signal sequences outputted from the convolutional encoding means by a maximum likelihood sequence estimation algorithm;

differential phase estimating means for estimating a differential phase signal from the phase difference signal outputted from said one-symbol differential detecting means;

first mapping means for converting an output of said differential phase estimating means into a corresponding bit sequence;

second mapping means for converting a phase difference signal output based on a sequence estimation outputted from said multiple differential detecting means involving maximum likelihood sequence estimation into a corresponding bit sequence;

delaying means for causing a timing of the bit sequence outputted from said first mapping means to coincide with a timing of the bit sequence outputted from said second mapping means;

bit sequence selecting means for selecting one of the bit sequence outputted from said first mapping means whose timing is adjusted by said delaying means and the bit sequence outputted from said second mapping means in accordance with a predetermined criterion;

sync word detecting means for determining the detection or nondetection of a sync word from the bit sequence outputted from said bit sequence selecting means;

synchronization controlling means for determining a timing of a received frame, and for controlling, as required, a transmission timing, using information on the sync word detection pulse; and received information extracting means for extracting received information from the bit sequence outputted from said multiple differential detecting means involving the maximum likelihood sequence estimation, based on the timing of the received frame determined by said synchronization controlling means.

10. A digital radiocommunication receiver according to claim 9, wherein a threshold of correlation used by said sync word detecting means is used as the criterion for selection by said bit sequence selecting means.

11. A digital radiocommunication receiver according to claim 9, wherein information on a state of frame synchronization is used as the criterion for selection by said bit sequence selecting means.

12. A digital radiocommunication receiver according to claim 9, wherein information on a received signal-to-noise ratio obtained separately is used as the criterion for selection by said bit sequence selecting means.

13. A digital radiocommunication receiver according to claim 9, wherein information on a received signal level obtained separately is used as the criterion for selection by said bit sequence selecting means.

14. A digital radiocommunication receiver comprising:

one-symbol differential detecting means for outputting a phase difference between a signal received at each point of time with respect to each symbol and a signal received a one-symbol length in the past;

multiple differential detecting means having differential phase, estimating means for determining a transmitted differential phase signal by using the phase difference signal, phase subtracting means for effecting subtraction between an estimated differential phase signal outputted from said differential phase estimating means and said phase difference signal, and convolutional encoding means for providing convolutional encoding with respect to an output of said phase subtracting means, said multiple differential detecting means involving maximum likelihood sequence estimation for effecting decoding a plurality of phase difference signal sequences outputted from the convolutional encoding means by a maximum likelihood sequence estimation algorithm;

first mapping means for converting an output of said differential phase estimating means into a corresponding bit sequence;

second mapping means for converting a phase difference signal output based on a sequence estimation outputted from said multiple differential detecting means involving the maximum likelihood sequence estimation into a corresponding bit sequence;

delaying means for causing a timing of the bit sequence outputted from said first mapping means to coincide with a timing of the bit sequence outputted from said second mapping means;

bit sequence selecting means for selecting one of the bit sequence outputted from said first mapping means whose timing is adjusted by said delaying means and the bit sequence outputted from said second mapping means in accordance with a predetermined criterion;

sync word detecting means for determining the detection or nondetection of a sync word from the bit sequence outputted from said bit sequence selecting means;

synchronization controlling means for determining a timing of a received frame, and for controlling, as required, a transmission timing, using information on the sync word detection pulse; and received information extracting means for extracting received information from the bit sequence outputted from said multiple differential detecting means involving the maximum likelihood sequence estimation, based on the timing of the received frame determined by said synchronization controlling means.

15. A digital radiocommunication receiver according to claim 14, wherein a threshold of correlation used by said sync word detecting means is used as the criterion for selection by said bit sequence selecting means.

16. A digital radiocommunication receiver according to claim 14, wherein information on a state of frame synchronization is used as the criterion for selection by said bit sequence selecting means.

17. A digital radiocommunication receiver according to claim 14, wherein information on a received signal-to-noise ratio obtained separately is used as the criterion for selection by said bit sequence selecting means.

18. A digital radiocommunication receiver according to claim 14, wherein information on a received signal level obtained separately is used as the criterion for selection by said bit sequence selecting means.

* * * * *